United States Patent
Merten et al.

(10) Patent No.: US 11,055,203 B2
(45) Date of Patent: *Jul. 6, 2021

(54) VIRTUALIZING PRECISE EVENT BASED SAMPLING

(71) Applicant: Intel Corporation, Santa Clara, CA (US)

(72) Inventors: Matthew C. Merten, Hillsboro, OR (US); Beeman C. Strong, Portland, OR (US); Michael W. Chynoweth, Rio Rancho, NM (US); Grant G. Zhou, Chandler, AZ (US); Andreas Kleen, Portland, OR (US); Kimberly C. Weier, Austin, TX (US); Angela D. Schmid, Pleasanton, CA (US); Stanislav Bratanov, Nizhniy Novgorod (RU); Seth Abraham, Tempe, AZ (US); Jason W. Brandt, Austin, TX (US); Ahmad Yasin, Kafr Manda (IL)

(73) Assignee: Intel Corporation, Santa Clara, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/699,871

(22) Filed: Dec. 2, 2019

(65) Prior Publication Data
US 2020/0242003 A1 Jul. 30, 2020

Related U.S. Application Data

(60) Continuation of application No. 15/972,390, filed on May 7, 2018, now Pat. No. 10,496,522, which is a
(Continued)

(51) Int. Cl.
*G06F 11/36* (2006.01)
*G06F 9/455* (2018.01)
(Continued)

(52) U.S. Cl.
CPC ...... *G06F 11/3636* (2013.01); *G06F 9/45558* (2013.01); *G06F 2009/45591* (2013.01); *H04L 41/0613* (2013.01); *H04L 43/04* (2013.01)

(58) Field of Classification Search
CPC ............. G06F 11/3636; G06F 9/45558; G06F 2009/45591; H04L 41/0613; H04L 43/04
See application file for complete search history.

(56) References Cited

U.S. PATENT DOCUMENTS

| 4,020,471 A | 4/1977 | Woods et al. |
| 4,787,031 A | 11/1988 | Karger et al. |

(Continued)

OTHER PUBLICATIONS

Aguerre et al., "Fully-Distributed Debugging and Visualization of Distributed Systems in Anonymous Networks", HAL, hal-00697093, May 2012, pp. 1-12 (Year: 2012).*

(Continued)

*Primary Examiner* — Wei Y Zhen
*Assistant Examiner* — Amir Soltanzadeh
(74) *Attorney, Agent, or Firm* — Nicholson De Vos Webster & Elliott LLP

(57) ABSTRACT

A processor is to execute and retire instructions for a virtual machine. A reload register is coupled to the core is to store a reload value. A performance monitoring counter (PMC) register is coupled to the reload register and an event-based sampler operatively is coupled to the reload register and the PMC register. The event-based sampler includes circuitry to load the reload value into the PMC register and increment the PMC register after detecting each occurrence of an event of a certain type as a result of execution of the instructions. Upon detecting an occurrence of the event after the PMC register reaches a predetermined trigger value, the event-based sampler is to execute microcode to generate field data for elements within a sampling record, wherein the field data
(Continued)

relates to a current processor state of execution, and reload the reload value from the reload register into the PMC register.

20 Claims, 13 Drawing Sheets

Related U.S. Application Data division of application No. 15/194,881, filed on Jun. 28, 2016, now Pat. No. 9,965,375.

(51) Int. Cl.
*H04L 12/24* (2006.01)
*H04L 12/26* (2006.01)

(56) References Cited

U.S. PATENT DOCUMENTS

| | | | |
|---|---|---|---|
| 5,668,994 | A | 9/1997 | Swagerman |
| 6,092,180 | A | 7/2000 | Anderson et al. |
| 6,266,789 | B1 | 7/2001 | Bucher et al. |
| 6,513,155 | B1 | 1/2003 | Alexander, III et al. |
| 6,738,965 | B1 | 5/2004 | Webster |
| 6,961,806 | B1 | 11/2005 | Agesen et al. |
| 7,454,665 | B2 | 11/2008 | Menadue |
| 7,747,989 | B1 | 6/2010 | Kissell |
| 7,818,721 | B2 | 10/2010 | Sundararajan et al. |
| 8,136,096 | B1 | 3/2012 | Lindahl et al. |
| 8,615,742 | B2 | 12/2013 | Indukuru et al. |
| 8,826,270 | B1 | 9/2014 | Lewis et al. |
| 8,832,682 | B2 | 9/2014 | Xu et al. |
| 9,053,064 | B2 | 6/2015 | Garthwaite et al. |
| 9,063,762 | B2 | 6/2015 | Serebrin et al. |
| 9,329,884 | B2 | 5/2016 | Strong et al. |
| 9,465,680 | B1 | 10/2016 | Chynoweth et al. |
| 9,766,999 | B2 | 9/2017 | Combs et al. |
| 10,055,334 | B2* | 8/2018 | Lentz .............. G06F 3/0484 |
| 2003/0126516 | A1 | 7/2003 | Komarla et al. |
| 2003/0131039 | A1 | 7/2003 | Bajoria et al. |
| 2005/0268075 | A1 | 12/2005 | Caprioli et al. |
| 2005/0268158 | A1 | 12/2005 | McIntosh et al. |
| 2005/0273310 | A1 | 12/2005 | Newburn |
| 2005/0278574 | A1 | 12/2005 | Kitamorn et al. |
| 2006/0277435 | A1 | 12/2006 | Pedersen et al. |
| 2007/0006032 | A1 | 1/2007 | Sun |
| 2007/0180439 | A1 | 8/2007 | Sundararajan et al. |
| 2008/0010551 | A1 | 1/2008 | Arndt et al. |
| 2008/0243970 | A1 | 10/2008 | Schmelter et al. |
| 2008/0244531 | A1 | 10/2008 | Schmelter et al. |
| 2008/0263309 | A1 | 10/2008 | Attinella |
| 2009/0083735 | A1 | 3/2009 | Kimura |
| 2009/0157359 | A1 | 6/2009 | Chernoff |
| 2009/0248611 | A1 | 10/2009 | Xu et al. |
| 2009/0276185 | A1 | 11/2009 | Mericas |
| 2010/0161875 | A1 | 6/2010 | Chang et al. |
| 2010/0235836 | A1 | 9/2010 | Bratanov |
| 2012/0011504 | A1 | 1/2012 | Ahmad et al. |
| 2012/0046912 | A1 | 2/2012 | Indukuru et al. |
| 2012/0226477 | A1 | 9/2012 | Cascaval et al. |
| 2013/0019248 | A1 | 1/2013 | Yu |
| 2013/0219389 | A1* | 8/2013 | Serebrin .............. G06F 9/45558 718/1 |
| 2013/0263093 | A1 | 10/2013 | Brandt et al. |
| 2014/0013020 | A1 | 1/2014 | Horsnell et al. |
| 2014/0013091 | A1 | 1/2014 | Yasin et al. |
| 2014/0156910 | A1 | 6/2014 | Uttamchandani et al. |
| 2014/0164722 | A1 | 6/2014 | Garthwaite et al. |
| 2014/0164723 | A1 | 6/2014 | Garthwaite et al. |
| 2014/0259011 | A1 | 9/2014 | Tashiro et al. |
| 2014/0301213 | A1 | 10/2014 | Khanal et al. |
| 2014/0344831 | A1 | 11/2014 | Levine |
| 2015/0127994 | A1 | 5/2015 | Sankar et al. |
| 2015/0178168 | A1 | 6/2015 | Dunshea et al. |
| 2015/0347267 | A1 | 12/2015 | Combs et al. |
| 2016/0011893 | A1 | 1/2016 | Strong et al. |
| 2016/0019062 | A1 | 1/2016 | Yasin et al. |
| 2016/0179541 | A1 | 6/2016 | Gramunt et al. |
| 2016/0292061 | A1* | 10/2016 | Marron .............. G06F 11/3636 |
| 2016/0378655 | A1 | 12/2016 | Blagodurov et al. |

OTHER PUBLICATIONS

International Preliminary Report on Patentability, PCT App. No. PCT/US2017/034331, dated Jan. 10, 2019, 8 pages.
Notice of Allowance, U.S. Appl. No. 15/194,881, dated Jan. 4, 2018, 10 pages.
Notice of Allowance, U.S. Appl. No. 15/972,390, dated Jul. 25, 2019, 9 pages.
Andrew S. Tanenbaum, "Structured Computer Organization," Prentice-Hall, Second Edition, 5 pages, 1984.
International Search Report and Written Opinion for PCT/US2017/034331, 9 pages, dated Sep. 6, 2017.
Bitzes, Georgios et al., "The Overhead of Profiling Using PMU Hardward Counters," CERN openlab Report 2014, 16 pages, Jul. 2014.

* cited by examiner

| Packet Type | Packet Payload | Byte 0 | Byte 1 | Byte 2 | Byte 3 | Byte 4 | Byte 5 | Byte 6 | Byte 7 | Byte 8 |
|---|---|---|---|---|---|---|---|---|---|---|
| TSC | TSC | 0x19 | | | | TSC[56:0] | | | | |
| BLOCK_BEGIN | PEBS | 0x02 | 0x63 | 0x03 | | | | | | |
| | ApplicableCounters | 0x04 | | | | ApplicableCounters[63:0] | | | | |
| | EventingIP | 0x0C | | | | EventingIP[63:0] | | | | |
| | MemAuxInfo | 0x14 | | | | DataSrc[63:0] | | | | |
| | MemAccessLatency | 0x1C | | | | AccessLatency[63:0] | | | | |
| | MemAccessAddress | 0x24 | | | | DLA[63:0] | | | | |
| | TSXAuxInfo | 0x2C | | | | TXAbortInfo[63:0] | | | | |
| BLOCK_BEGIN | GPRs | 0x02 | 0x63 | 0x01 | | | | | | |
| | R/EFLAGS | 0x04 | | | | R/EFLAGS[63:0] | | | | |
| | R15 | 0x84 | | | | R15[63:0] | | | | |
| | ...Other GPR items... | | | | | | | | | |
| BLOCK_BEGIN | LBR_FROM | 0x02 | 0x63 | 0x04 | | | | | | |
| | LBR[TOS-0]_FROM_IP | 0x04 | | | | LBR[TOS-0]_FROM_IP[63:0] | | | | |
| | ...Other LBR_FROM, LBR_TO, LBR_INFO, XMM... | | | | | | | | | |
| | XMM15_Q1 | 0xFC | | | | XMM15[127:64] | | | | |
| BLOCK_END | | 0x02 | 0xe3 | | | | | | | |
| FUP | RIP | 0x7d | | | | RIP[63:0] (compressed) | | | | |

FIG. 2

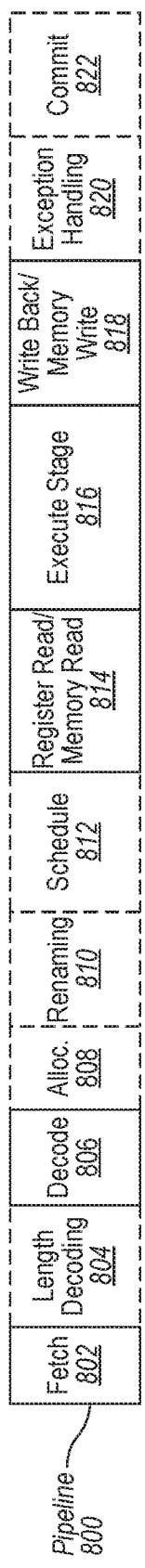
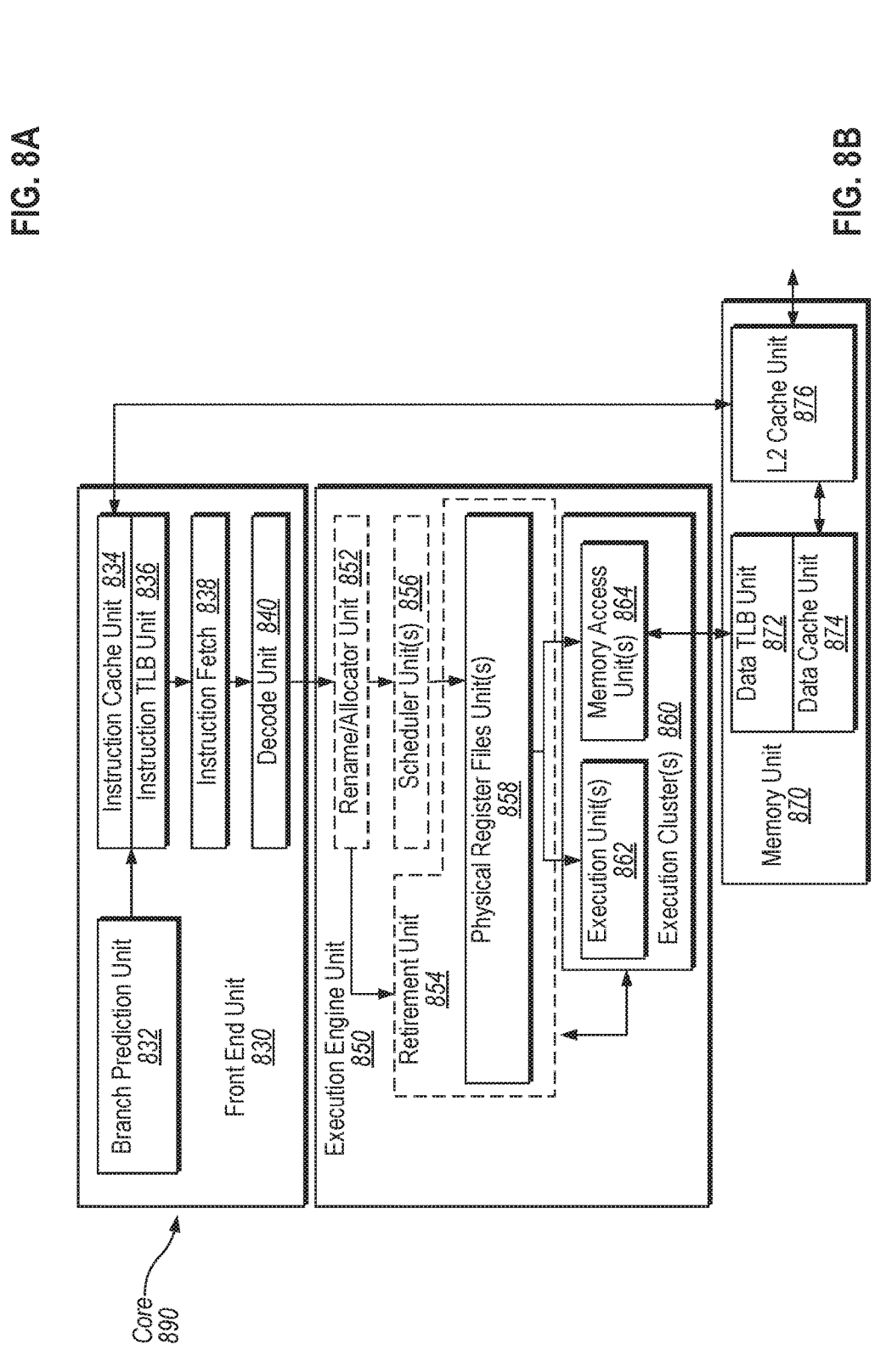
FIG. 8A
FIG. 8B

VIRTUALIZING PRECISE EVENT BASED SAMPLING

RELATED APPLICATIONS

This application is a continuation of U.S. patent application Ser. No. 15/972,390, filed May 7, 2018, now U.S. Pat. No. 10,496,522, issued on Dec. 3, 2019, which is a divisional of U.S. Patent Application Ser. No. 15/194,881, filed Jun. 28, 2016, now U.S. Pat. No. 9,965,375, issued on May 8, 2018, the entire contents of which are hereby incorporated by reference herein.

TECHNICAL FIELD

Embodiments described herein generally relate to processing devices and, more specifically, relate to the management of precise event based sampling in a virtualized environment.

TECHNICAL FIELD

Background

A processor may generate trace data regarding software being executed by the processor and generally does so for any instruction retiring within the processor, producing a large volume of information. The trace data may be used by programmers for debugging purposes. The trace data may also be used by system administrators or technical support personnel and software monitoring tools to diagnose problems with installed software. There has also been some virtualization of capturing trace data within a virtual machine executed by the processor, where supported. An additional debugging feature referred to as Precise Event Based Sampling (PEBS) may also be enabled within the processor. PEBS is a profiling mechanism that logs a snapshot of processor state at the time of the event, allowing users to attribute performance events to actual instruction pointers (IPs). Developers have not been able to reliably or efficiently virtualize PEBS.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a table of a set of data packets illustrating specification of a group of precise event-based sampling (PEBS) packets inserted between trace data packets, according to an embodiment of the disclosure.

FIG. 8A is a block diagram illustrating an in-order pipeline and a register renaming stage, out-of-order issue/execution pipeline implemented by a processor core, in accordance with one embodiment of the present disclosure.

FIG. 8B is a block diagram illustrating an in-order architecture core and a register renaming logic, out-of-order issue/execution logic to be included in a processor according to at least one embodiment of the disclosure.

DESCRIPTION OF EMBODIMENTS

Figure 1A:
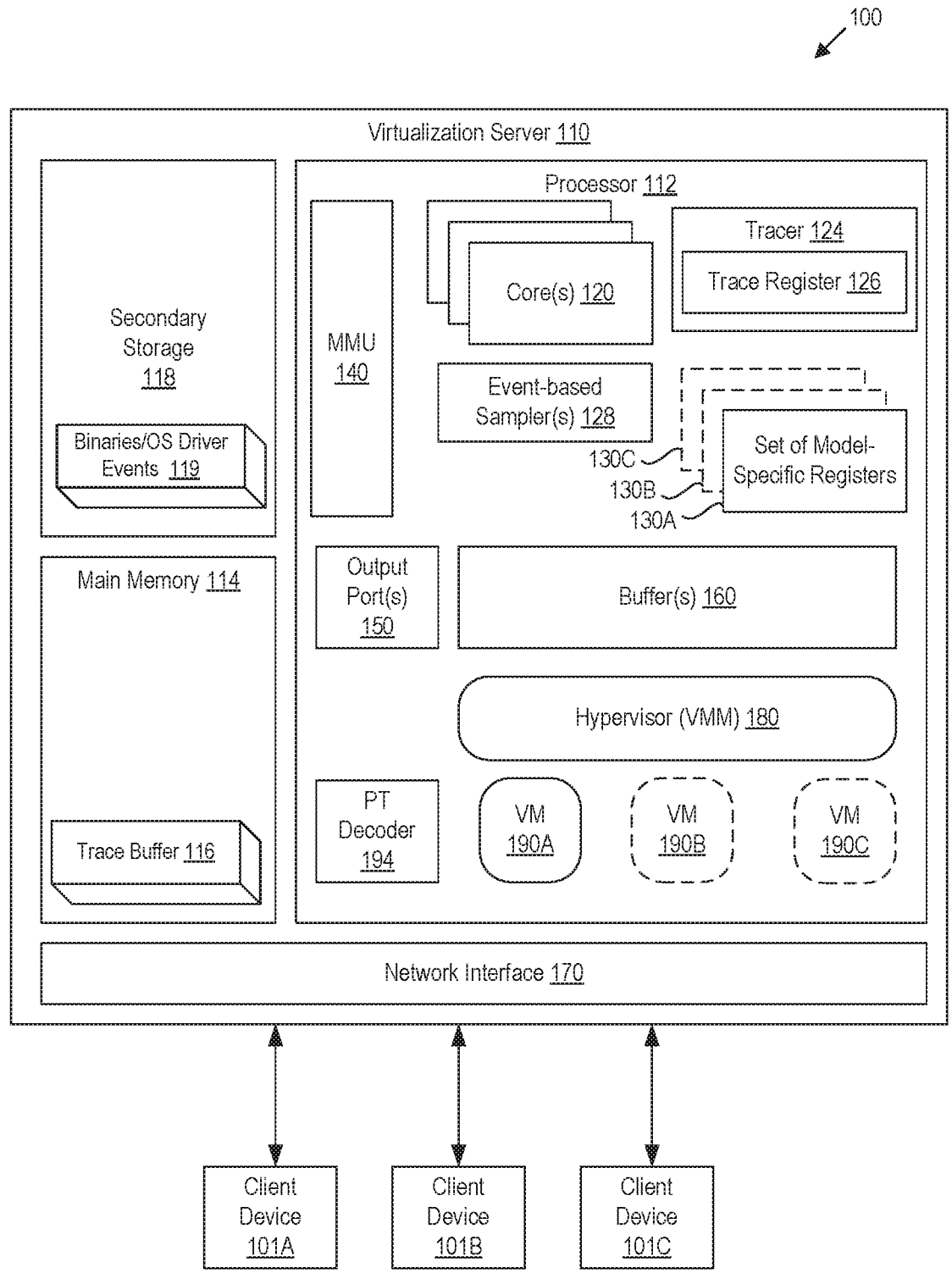
FIG. 1A is schematic block diagram of a virtualization system, according to an embodiment of the disclosure.

Precise event-based sampling (PEBS) saves a snapshot of a processor state to a memory buffer on every $n^{th}$ count of occurrence of an event of the type programmed into a performance monitoring counter (PMC). An event is a change of processor execution state (including memory states) or a performance-related trigger produced by execution of an instruction. The event type may be chosen from an extensive list of performance-related events to monitor, such as for example: cache misses, remote cache hits, branch mispredictions, bad store-to-load forwards, function call retired, x87 floating point assist, split cache-line access, transactional synchronization abort, MMX™ instruction retired, and various kinds of hardware stalls and the like. The list of supported event types varies depending on the manufacturer of the model of the processor. The processor state may include the execution instruction pointer (IP) and execution-related states such as counters, contents of registers and execution units, memory addresses, latencies, and the like that may affect processor performance.

More specifically, when an event counter associated with a specific event type overflows, the processor may trap instruction execution after a next matching event, record the processor state, reload the event counter, and resume execution of instructions. Accordingly, the PEBS data is being generated periodically, and performance related to the specific event may be extrapolated between counter overflows using statistical analysis.

PEBS allows processor hardware to collect additional processor-based execution information related to an event when a corresponding event counter overflows. PEBS may also provide analysis and debugging tools with more accurate information regarding execution of an instruction that triggers occurrence of the specific event type, and thus may provide context to trace data. PEBS sampling is the alternative to waiting for an interrupt triggered by the counter overflow to collect such information, typically tens to hundreds of cycles later (due to processing through the interrupt controller). This IP skid could be much larger if interrupts are temporarily masked or blocked due to the processor performing certain activities. In such cases, the skid may be large enough that the collected sample is not indicative of the code executed when the counter actually overflowed. PEBS may avoid this misinformation by relying on hardware to generate the sample independent of interrupts.

The PEBS feature, therefore, may be used heavily for performance debugging by analyzing concentrations of various performance events, such as remote cache hits or bad store-to-load forwards, and attribute such events to specific instructions. With detailed contextual information, software developers may profile an application to identify where performance issues occur and thus better formulate their code. System analysts may also profile end-to-end execution, looking for insight into application, driver and operating system (OS) interactions and user experience design glitches. Accordingly, PEBS may be employed in performance tools such as vTune®, Linux Perf, etc.

Modern computing systems, however, are increasingly running with virtualization enabled. Virtualization technologies allow multiple operating systems to be simultaneously running on the system, protected from one another, and arbitrated and controlled by a virtual machine monitor (VMM). Traditional operating systems run as guests within a virtualization system, and not just in a cloud server space, while the VMM runs as the root. Client systems are using virtualization as well. Furthermore, a security service of a computing device may be run at the elevated privilege level while the guest OS is run at a lower privilege level, thus improving security of the guest. In some cases, developers would like to profile the whole system, including VMMs and guests, to look at overall performance. This may be referred to as "system-wide" profiling. In other cases, developers are confined to a guest and need access to PEBS monitoring just within that guest. This may be referred to as "guest-only" profiling. In yet other cases, system analysts are only allowed to use PEBS monitoring within the root and certain guests, while other guests are off-limits such as for data privacy reasons. This may be referred to as "host-only" or "host and partial guest" profiling, respectively.

PEBS configuration and output mechanisms, however, are not amenable to virtualization for various reasons. For example, PEBS cannot handle violations in multilevel page tables (MPT) used for nested paging in second-level address translation (SLAT) used in virtualization. These multilevel page tables are a hardware-assisted virtualization technology that makes it possible to avoid overhead associated with software-managed shadow page tables by facilitating translations between guest virtual addresses and host physical addresses. In one embodiment, the multilevel page tables are known as Extended Page Tables (EPT) by Intel Corporation, of Santa Clara, Calif. In another embodiment, the multilevel page tables are known as Stage-2 page tables by ARM Holdings, Ltd. of San Jose, Calif.

A multilevel page table violation occurs when linearly (sometimes referred to as virtually) addressed PEBS configuration pages and PEBS output buffer pages are not mapped to physical pages by the VMM. Even if the OS maps the configuration and output pages to what it believes is physical memory (known as guest physical memory), the VMM performs the final mapping of guest physical memory to actual memory, referred to as host physical memory. It is possible that not all of the guest physical memory assigned by all of the active OS guests may be simultaneously mapped to host physical memory. If a page is accessed by the PEBS record generation mechanism that is properly mapped in guest physical memory but is not mapped into host physical memory, execution control may need to be transferred to the VMM in order to properly map the page. After mapping the page, it may not be possible to resume generation of the PEBS record because the event that triggered the PEBS record generation has passed and state values have changed. Further, when performing system-wide profiling, it is difficult for the VMM to force each guest OS to allocate regions of virtual memory of the same size that the VMM locates in the OS's guest physical memory maps, and co-maps into the same host physical memory.

Furthermore, PEBS is not currently adapted for control around transitions between VMs and the VMM, e.g., turning off PEBS record generation upon leaving the guest to enter VMM execution (known as VM-exit) and turning PEBS record generation back on upon returning to guest execution (known as VM-entry). This is a problem for the "guest-only" tracing usage model.

The configuration memory block is a set of fields that contains: base, current, and max linear (virtual) addresses of the output buffer, and the reload values for each counter. After a record is generated, a PMC counter is automatically reloaded with these reload values to implement periodic record generation. This configuration block of memory is located by a linear (virtual) address located in IA32_DS_AREA model specific register, as will be discussed.

Tracing refers to logging every incidence of an event, such as control flow transfers, which is to be distinguished from sampling, where only a fraction of events trigger logging of processor state. Intel Corporation of Santa Clara, Calif. supports a tracing feature known as Intel® Processor Trace (PT). PT now includes mechanisms to support virtualization and is increasingly being employed to gain detailed insight into execution, from control flow tracing to power event tracing, and more. Furthermore, PT includes mechanisms to obey the same profiling modes, such as full-system, guest-only, host-only, and the like. Having PEBS output to a PEBS buffer separate from a trace buffer to which PT is output requires tool developers and VM vendors to manage two separate output mechanisms to obtain the broad spectrum of performance data that modern processors may provide, thus complicating approach to obtaining information needed for analysis and debugging.

Current solutions for virtualizing PEBS require the guest OS to enable the management and prevention of page faults. When a page fault or an MPT violation occurs, a PEBS record is dropped because hardware execution of microcode that produces the PEBS record is interrupted and cannot be resumed. Microcode is considered to be part of processor hardware as low-level micro-instructions embedded with the hardware. When a page fault occurs (e.g., the guest OS has not mapped a linear address to the guest physical memory) or an MPT violation occurs (e.g., the VMM has not mapped a guest physical page to the host physical memory) related to the output buffer pages, the PEBS record would be abandoned in the middle of the page fault or MPT violation. Some of the page faults might occur when executing guest code, which may lead to "blue screens" or "kernel panics." Furthermore, dropping a PEBS record is not desired as doing so interferes with statistical sampling and proper execution of debugging and troubleshooting. Because of this, some processors may require that an OS map the PEBS output buffer and configuration block linear addresses into physical memory (in non-virtualized systems). In virtualized systems, this requirement may grow to include both the OS mapping the pages from linear to guest physical memory as well as the VMM mapping the guest-physical memory to host physical memory. This latter step is more because the VMM directs each OS to configure the output buffer in a similar manner, or directs each OS to configure the output buffer in its own way while the VMM pieces per-guest output blocks into one merged output block.

The present disclosure resolves these concerns with page fault and MPT violations by packaging and routing PEBS data within a trace (or PT) stream so that the PEBS data may be output and retrieved with PT-available mechanisms that handle page faults and MPT violations as will be explained. More specifically, an event-based sampler may transmit PEBS-captured field data for elements of a PEBS (or sampling) record to a processor tracer in response to occurrence of an event of a certain type as a result of execution of an instruction. This field data may be of a particular format (e.g., include a header identifying the subsequent data as PEBS field data destined for the tracer) such that the processor tracer may detect and capture the field data.

Upon receipt, the processor tracer may format (e.g., packetize or package) the captured field data of the sampling (PEBS) record, converting the field data into a PEBS record packet compatible with the processor tracer's output format. In one embodiment, this PEBS record packet is a single packet containing a plurality of packetized elements. In yet another embodiment, the PEBS record packet includes a group of packetized elements (e.g., a group of PEBS record packets generated at a field or element level), which may be transmitted as a group or transmitted separately. The processor tracer may then insert the PEBS record packet(s) between a plurality of trace data packets of a trace data (or PT) stream such as control flow packets and power event packets, for example, to generate a combined packet stream. The processor tracer may store the combined packet stream in a memory buffer as a series of output pages or route it to a port (pin) controlled by the processor. When in a system-wide profiling mode, the processor may address the processor trace output pages as host physical pages.

Accordingly, the PEBS record is formatted to fit within and be handled by PT mechanisms that already include support for virtualization (such as resolving page faults and MPT violations) as will be discussed in detail. As just one example, existing PT output targets are available to which to stream the PEBS record packets (with the trace data packets), including to a contiguous buffer, a table of physical addresses (ToPA) or other distributed memory buffer, or to a trace aggregator such as a trace hub. When using guest-only profiling, these buffers may be addressed using guest physical addresses, and the VMM may use MPT to map the guest physical pages to host physical memory. The processor may avoid trace corruption due to MPT violations in part by enabling prefetching a next trace output page at a convenient time, before the page is needed for output. More specifically, PT may maintain mapping of two output pages. When the PT hardware detects that it filled the first output page and moved onto writing the second output page, the processor may then determine the next (third) output page and test whether the next output page is mapped. If the next output page is not mapped, the processor may trigger a VM-exit to request that the VMM map this next output page. This lookup could be implemented in hardware, or using microcode. In this way, PEBS may maintain the current output page and the next output page ready to be written to. The advantage of such a scheme is that any MPT violation for a page is taken before the processor needs to write to that page, ensuring that the MPT violation doesn't cause trace data to be dropped. These types of virtualization mechanisms available to PT outputs also become available to the PEBS output (e.g., PEBS record packets) due to being interleaved within the PT stream.

In one embodiment, counter reload values (which dictate when the event counter is to overflow and thus generate a PEBS record) may also be moved from linear addresses in a debug store (DS) management area to model-specific registers (MSRs) to eliminate reliance on memory-based configuration of PEBS, e.g., eliminate need to access linearly-accessed memory to obtain event counter reload information and PEBS output page addresses. The DS management area stores PEBS records within a linearly-addressed memory buffer when a PMC counter overflows. Furthermore, Virtual Machine Control Structure (VMCS) structures are provided, in part, to configure VM-entry and VM-exit flows of a virtual machine. These can be configured to save and restore counter enables and Last Branch Registers (LBRs) when going in and out of a guest VM, which may enable full support of guest-only profiling modes as will be explained in detail.

Figure 1B:
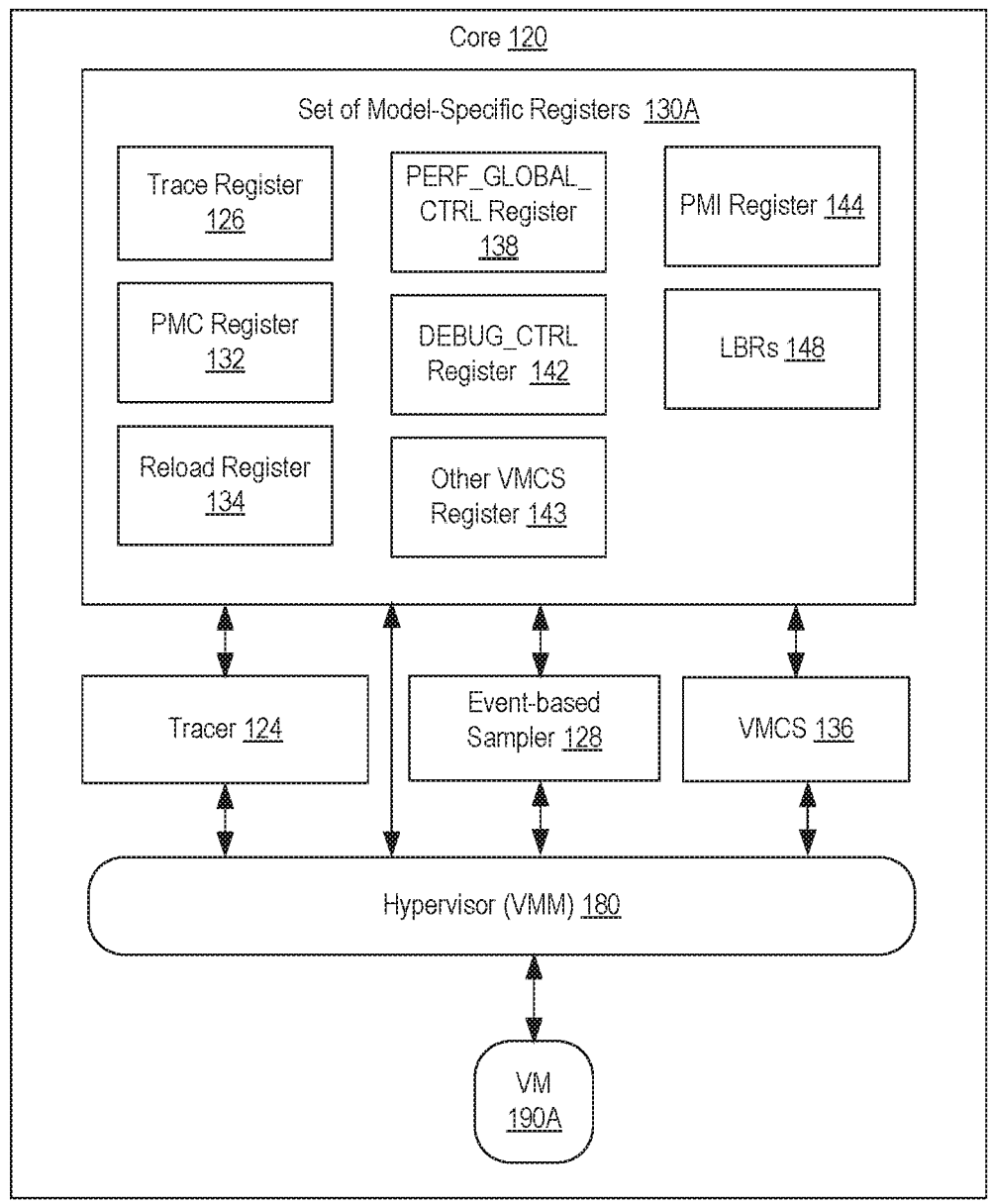
FIG. 1B is a schematic block diagram of a detailed view of the model-specific registers of the processor shown in FIG. 1A, according to an embodiment of the disclosure.

FIG. 1A is a schematic block diagram of a virtualization system 100 according to an embodiment of the disclosure. The virtualization system 100 includes a virtualization server 110 that supports a number of client devices 101A-101C. The virtualization server 110 includes at least one processor 112 that executes a hypervisor 180 that may instantiate one or more virtual machines 190A-190C accessible by the client devices 101A-101C via a network interface 170. The processor 112 may include one or more cores 120, a processor tracer 124 (or just "tracer 124"), event-based sampler(s) 128, sets of model-specific registers (MSRs) 103A-130C (one set for each of a plurality of VMs 190A-190C), a memory management unit (MMU) 140, output port(s) 150, one or more memory buffers 160, a hypervisor (or VMM) 180 and a processor trace (PT) decoder 194. FIG. 1B is a schematic block diagram of a detailed view of the model-specific registers 130 of a processor core of the cores 120 shown in FIG. 1A.

The virtualization server 110 includes a main memory 114, including a trace buffer 116 section, and a secondary storage 118 having a database 119 to store program binaries and operating system (OS) driver events, among trace and PEBS data overflow. Data in the secondary storage 118 may be stored in blocks referred to as pages, and each page may correspond to a set of physical memory addresses. The virtualization server 110 may employ virtual memory management in which applications run by the core(s) 120, such as the virtual machines 190A-190C, use virtual memory addresses that are mapped to guest physical memory addresses by a memory management unit (MMU) 140.

The core 120 may execute the MMU 140 to load pages from the secondary storage 118 into the main memory 114 for faster access by software running on the processor 112 (e.g., on the core). When one of the virtual machines 190A-190C attempts to access a virtual memory address that corresponds to a physical memory address of a page loaded into the main memory 114, the MMU 140 returns the requested data. The core 120 may execute the VMM 180 to translate guest physical addresses to host physical addresses of main memory, and provide parameters for a protocol that allows the core 120 to read, walk and interpret these mappings.

When one of the virtual machines attempts to access a virtual memory address that corresponds to a guest physical memory address of a page that is not loaded into the main (or host physical) memory 114, an MPT violation occurs and the MMU 140 generates a MPT violation as a fault or exception. When a MPT violation occurs, control of the core 120 may be transferred to the VMM 180 (via a VM-exit) to service the violation. The VMM 180 may handle the MPT violation by pausing the virtual machine, instructing the MMU 140 to load the page containing the host physical memory address corresponding to the requested virtual memory address, and resuming the virtual machine.

The core 120 may include a tracer 124 that captures trace data generated as a result of the processor 112 executing software instructions on hardware threads of the core 120 while tracing is enabled. The tracer 124 may also format (e.g., packetize or package) the trace data into individual trace data packets for routing as a packet stream. The tracer 124 may be implemented by microcode instructions, digital circuitry, analog circuitry, or a combination thereof. In one embodiment, the tracer 124 includes primarily dedicated hardware circuitry and microcode, although the tracer 124 (or a separate software tool) may also execute software instructions to take over handling of the data packets once generated by the dedicated hardware and firmware. The tracer 124 may include a trace register 126 that stores a value indicating whether tracing is enabled or disabled. As with other data generated by the processor 112, the trace data of the packet stream may be initially stored in an internal memory buffer 160 before being written to the main memory 114. Once the trace data is in the main memory 114, software may access the trace data and analyze it or present it to a user for interpretation.

A virtual machine 190A, 190B, or 190C may each include a guest operating system and one or more applications using the processor 112. For example, the virtual machine may execute a debugging application that enables tracing, allowing a user of the virtual machine to debug the guest OS or other applications executed by the virtual machine. The virtual machine may specify a set of virtual memory addresses in which to store the generated trace data within the trace buffer 116.

With further reference to FIG. 1B, in one embodiment, each core 120 may include the set of model-specific register (MSRs) 130A for use by one or more VM 190A, although many of the MSRs can be shared by a single core or across several cores 120. In one embodiment, MSRs may be swapped in and out of a core when a VM is swapped in and out of the core. Each core 120 may also include a virtual machine control structure (VMCS) 136 to hold the current state of a VM when this swapping occurs.

By way of example, the set of model-specific registers 130A of FIG. 1A is shown in more detail in FIG. 1B. The set of model-specific registers 130A may include, but not be limited to, the trace register 126 (FIG. 1A), a performance monitoring counter (PMC) register 132, a reload register 134, a PERF_GLOBAL_CTRL register 138, a DEBUG_C-TRL register 142, and any other VMCS register 143; a performance monitoring interrupt (PMI) register 144, one or more last branch registers 148. The VMCS 136 may hold the value of each of register 138, 142, and 143 as part the VM state when a corresponding VM is swapped in or out of a core. The MSRs 130A will be described in more detail below, but each plays a role in facilitating control tracing and PEBS data generation within a virtualization environment where one or more virtual machines operate on the virtualization server 110. Accordingly, some of these registers also help to facilitate the VMM 180 support the use of PEBS in a system-wide, guest and host type of way that is transparent as possible to the host when the processor 112 performs a VM-exit and VM-entry, as will be explained in more detail below.

In one embodiment, the processor 112 may include any kind or number of event-based samplers 128. While the event-based samplers 128 are illustrated as separate from the cores 120 in FIG. 1A, an event-based sampler 128 may be implemented in a core as can other hardware and firmware described herein such as the tracer 124 and set of MSRs 130A-130C for example, as illustrated in part in FIG. 1B. For example, in guest-only modes, each VM may have its own tracer, event-based sampler, and register states that are swapped into and out of the cores 120 when that VM is swapped into and out of the cores. In full-system mode, the tracer, event-based sampler, and registers may be configured once and persist across VM swaps. Note that several different virtual machines may be running simultaneously on different cores.

The event-based sampler 128 may be implemented by microcode instructions, digital circuitry, analog circuitry, or a combination thereof. In another embodiment, the event-based sampler 128 may record and store information about processor execution from sources such as performance counters, registers and execution units, which may be included in cores or in another portion of the processor 112. In yet another embodiment, the event-based sampler 128 may record and store information about processor execution by selectively dumping the contents of register, counters, or other portions of the processor 112.

The event-based sampler 128 may record and store information about the execution of processor at any suitable time. In one embodiment, the event-based sampler 128 may perform data collection upon retirement of the instructions, after execution. The event-based sampler may thus record information for a given retired instruction after it is executed, providing a snapshot of processor state at such a time. In another embodiment, event-based sampler may perform data collection upon retirement of memory access instructions such as loads or stores. In another embodiment, the event-based sampler may perform data collection after the oldest instruction retires in response to an unrelated activity elsewhere in the processor, providing the time of the occurrence of the event.

The event-based sampler 128 may output the results of performing data collection to any suitable destination. In one embodiment, the event-based sampler may output the results to a record such as the memory buffer 160 or an output port 150 as a memory-staging step before being saved into the trace buffer 116 (or other trace storage destination). A base address and range for the PEBS records within the trace buffer 116 for other storage) may be defined by a register, Upon receipt of such data in the trace buffer 116 (or other storage) at specified addresses, the data may be used to perform various analyses with respect to the processor 112. For example, secure profiling may be performed, wherein the current state of the processor is analyzed to determine whether a security or malware breach has occurred. In one embodiment, a profiler may obtain a statistical call stack for the sampling information returned from a retired instruction. in another embodiment, a profiler may perform call parameter profiling using a pre-computed value of a common compute-heavy function, such as encryption.

As discussed, while tracing involves generating trace data for any instruction retiring in the processor 112, PEBS sampling involves taking snapshots of the processor state periodically and then relying on statistical analysis to extrapolate between snapshots to obtain a fuller picture of performance surrounding execution events of interest. In short, when an event counter overflows, the processor 112 may trap execution after a next matching event, record a processor state, reload the counter, and resume execution. To capture the processor state, PEBS microcode may generate (e.g., "dump") a log or record of data (e.g., an instruction pointer (IP), processor execution states, memory access addresses and latencies, and the like) upon occurrence of an event for an $n^{th}$ time. Configuration of the PEBS output buffer and the PEBS reload values may be done through a set of fields stored in linearly addressed memory. The microcode flow or combinational logic that generates a PEBS record in this way, however, is non-reentrant: the function requires that the OS pin the output buffer pages so that there is no page fault in the middle of the microcode flow.

In one embodiment, and as a first step to making the PEBS data generation amenable to virtualization, the event-based sampler 128 may execute (whether by hardware or microcode execution, for example) a series of signal operations that transmit, to the tracer 124, event-based field data for elements of a PEBS sampling record (or log) so that the tracer 124 can incorporate the sampling record into the PT stream. The signal operations generate the field data in a format that the tracer 124 recognizes and can capture, and is therefore tracer compatible. For example, the field data for each element may contain a header to identify the type of data and the element within the sampling record to which the field data relates. In one implementation of the microcode, the signal operations are performed in a particular order so that the tracer 124 receives values for the elements in the same particular order. The tracer 124 may then further format (e.g., packetize or package) the field data into elements of the sampling record to generate a record packet, or as discussed, a group of record packets that each correlates to a packetized element. A record packet includes a header that identifies specific payload data as will be discussed below with reference to FIG. 2. The tracer 124 may further interleave these record packets in between trace data packets of the PT stream, and route the interleaved packet stream to a memory buffer 160 or a port 150 controlled by the tracer 124. This routing may be performed as previously done for PT streams.

FIG. 2 is a table 200 of a set of data packets illustrating a specification of a group of PEBS packets inserted between trace data packets, according to an embodiment of the disclosure. The table 200 includes a number of columns. Here, a "packet" is a data structure that includes a packet header, followed by a payload, and in some cases followed by a packet trailer. The first column and the second column of the table 200 may represent a packet header for each packet, where the first column includes the packet type 210 and the second column includes the packet payload 220. Additional columns may contain bytes 230 of the payload in the data packets. Many of the fields are self-describing in that the packet header indicates the type of data in the payload, and there is no need to enumerate a particular fixed layout where the packets can be routed in various orders.

In one embodiment, the BLOCK_BEGIN in the packet type column packets is followed by type and indicates that the subsequent bytes should be interpreted according to the BLOCK type. Note there are number of packets with header 0x04 in the table, for example. Those packets may look identical in the trace stream, but the preceding BLOCK_BEGIN packet type provides context for interpreting the packet payload 220 of the second column, such as whether the packet payloads are ApplicableCounters (of the PEBS packets) or R/EFLAGS (of the GPRs, which are discussed below). Those bytes would mean yet something different outside of the BLOCK context. After the BEGIN, other packet types are generally not allowed. Non-PEBS packets might look like the block field packets and would be misinterpreted inside the BLOCK context. This context ends when another BLOCK_BEGIN is encountered in the stream or a BLOCK_END is encountered.

As seen in the example specification of table 200, the first packet is a time stamped counter (TSC), which provides global system time that may provide context for when the PEBS packet was generated. The TSC packet may be inserted before or after the PEBS packets in different embodiments. For example, executing the PEBS hardware and/or microcode may cause a TSC packet to be inserted into the PT stream before a PEBS BLOCK_BEGIN packet to provide a timing context for when the PEBS packet was generated. The next packet, therefore, is one of the group of PEBS packets, which continue as "PEBS packets" until a BLOCK_END or another BLOCK_BEGIN indicating transition to another packet type. As illustrated, the PEBS packets are followed by a number of General Purpose Register (GPR) packets, each beginning with a BLOCK_BEGIN of packet payload type GPRs, which are basic registers used in general purpose programming of the processor. After the GPR packets is a Last Branch Register (LBR) packet, followed by a BLOCK_END indicator, which is in turn followed by flow update packet (FUP). The FUP provides the current instruction pointer at the time the record was taken. The FUP packet is also used when making an asynchronous transfer as the instruction pointer before the transfer.

The packet payload 220 indicates the type of data contained in the packet. For the PEBS packet, the first packet payload 220 field is "PEBS," signaling that the rest of the packet will contain various PEBS fields of record data. The following packet payload indicators within the PEBS record packet include, but are not limited to, applicable counters, an event-based instruction pointer (IP), memory auxiliary information, memory access latency, memory access address, and transaction synchronization instruction (TSX) auxiliary information.

With further reference to FIGS. 1A and 1B, in one embodiment, the microcode for both the trace packet data and the PEBS data is configured by Ring 0 (e.g., kernel or most privileged level of protection) software, making these processes as secure as possible. Software tools for debugging and performance analysis may then take the unified stream of PEBS and trace data packets and combine them with other information to produce a rich view of performance. The processor trace provides context within the trace data packets to the PEBS record packets. Additionally, information from the OS and the VMM can be further combined with this context from the trace data packets to pinpoint more exactly the context of a PEBS sample in execution. This information may then be fed to performance analysis tools such as vTune®, Linux Perf, etc.

Routing the PEBS packets within the PT output stream allows PEBS virtualization to take advantage of processor tracing support for both guest mode profiling and full-system mode profiling, as well as for an array of fault-tolerant output options available to PT. In one embodiment, when performing system-wide profiling, the memory buffers 160 may be programmed using host physical addresses. When performing guest-only profiling, these memory buffers 160 may be programmed using guest physical addresses, and the VMM 180 may employ extended page tables (MPT) to map the guest physical addresses to host physical addresses. This mechanism prevents MPT violations (e.g., where a guest page is not mapped to a host physical page) from corrupting the trace in part by prefetching a next output page at a convenient time as previously discussed. Relying on these memory management mechanisms allows profiling software simplification by providing a single unified output control for both PEBS and PT.

Furthermore, processor trace offers several different output options to different memory buffers 160 or output ports 150 (which may also include a memory buffer) now available to the combined output stream (e.g., the PEBS packets combined with the PT data packets). Accordingly, in various embodiments, the combined output stream may be stored in a Table of Physical Addresses (ToPA), Single Range output, and trace aggregators such as a Trace Hub. Storing the combined output stream to a ToPA may be a way of sending the stream to a distributed output buffer, similar to a page table but for a trace/PEBS output. The ToPA allocates memory in a distributed manner (e.g., to non-contiguous memory) to create a larger buffer for continuous buffering of PEBS output data in distributed memory blocks. The output ports 150 may communicate with output pins that are connected to trace debuggers and off-chip analyzers such as Lauterbach™.

A trace aggregator may be a PEBS storage location located somewhere other than memory, such as to various endpoints that may include a trace hub, off-chip debugger, or the like. In one embodiment, the connection to debug ports (such as ITP, USB, HDMI) is through the trace hub (or trace aggregator). A user may configure the trace hub to direct the trace output to DRAM, or one of the available debug ports. A Single Range may be a physically-addressed structure that is contiguous memory, e.g., a memory structure that includes a start pointer and an end pointer along a contiguous series of memory addresses. PEBS data sent to Single Range memory may then be sent to a specific output port, which is used more commonly when sending an output stream to memory-mapped IO. In another embodiment, a trace hub includes a sideband connection so that sharing the memory subsystem with loads and stores from software is not necessary. In this way, trace data does not interfere as much with tracing of software.

In some embodiments, the PEBS hardware or microcode may be adapted such that the event-based sampler may cause an interrupt to be triggered after detecting generation of a PEBS record packet. This capability can be enabled by setting the PMI register 144. When taken, the interrupt provides the core(s) 120 the opportunity to immediately transmit the record packet (along with optionally interleaved trace data packets) to an output pin for a debugger or an off-chip analyzer that needs the record packet (and optionally the interleaved trace data packets) to perform a debugging or troubleshooting function. In taking this action, the tracer 124 may also, in one embodiment, further buffer the PEBS record with other trace data packets for later output as well under a normal schedule.

Figure 3:
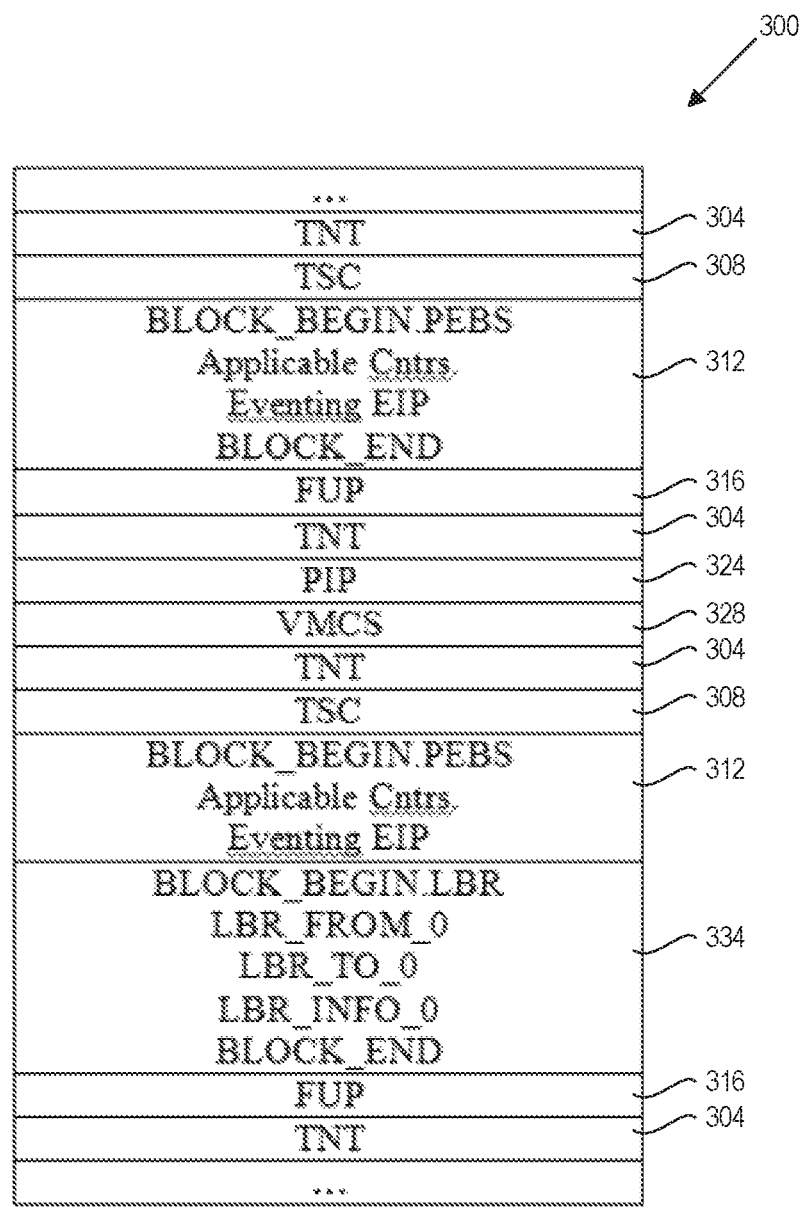
FIG. 3 is a diagram illustrating an example of a packet stream that interleaves trace data packets with PEBS packets, according to an embodiment of the disclosure.

FIG. 3 is a diagram illustrating an example of a packet stream 300 that interleaves trace data packets with PEBS packets, according to an embodiment of the disclosure. The event types reflected by trace data packets include, without limitation, taken/not taken condition branches (TNT) 304, time stamped counters (TSC) 308, flow update packets (FUP) 316, paging information packets (PIP) 324, virtual machine control structure (VMCS) packets 328, last branch register (LBR) packets 340, and target instruction pointer (TIP), the last of which is not shown. As discussed, a plurality of PEBS packets 312 may be interleaved between the trace data packets each containing applicable counters, an event-related execution instruction pointer (EIP), and various other data that makes up the PEBS record that is generated upon reaching the nth time an event of interest occurs.

In one embodiment, the tracer microcode may be configured such that a TSC packet 308 is generated responsive to detecting that a PEBS packet 312 is inserted into the packet stream 300. The PIP packets 324 includes data containing information related to the packet stream 300, and in particular, to provide information about a new application or program to which the VM 190A switched to execute from a previous application or program, or information about a new VM state to which the VM switched to execute from a previous VM state.

In one embodiment, a VMCS packet 328 contains a state of the virtual machine 190A, 190B, or 190C that is the active guest on the virtualization server 110 when, for example, execution exits the virtual machine so that the state is preserved. In this way, the virtualization server 110 can re-enter the virtual machine and pick up execution of the virtual machine from the preserved VM state. The VMCS registers 136 (FIG. 1B) provide control capability to the generation and preservation of the state and other VM data as will be further explained later.

With further reference to FIGS. 1A and 1B, when a PMC counter (such as may be stored in the PMC register 132) overflows after counting a specific number (e.g., "n") of events of a particular event type, PEBS is armed (e.g., prepared to capture a processor state within elements of a PEBS record), and the event-based sampler 128 is triggered to dump a PEBS record after the next instruction that triggers an event of the particular event type. In previous operation, the bounds of the memory buffer 160 (or output buffer) are checked, and if there is sufficient memory space, the values of the PEBS elements are written via store operations to the memory buffer 160 in memory. When the tracer 124 incorporates PEBS packet records in the memory buffer 160 interleaved with the trace data packets, however, no explicit check is needed for the output buffer bounds because the tracer 124 manages the buffer autonomously, e.g., with pre-configured circuitry and microcode without outside influence. Instead of writing the output buffer in memory directly through store operations, the event-based sampler 128 may, via microcode or hardware, perform a series of signal operations, each of which is an individual micro-operation to transmit field data of a specific field to the tracer 124.

In one embodiment, each signal operation of the series of signal operations may store its field data (from a PEBS dump) into a different general purpose register (e.g., r1, r2, r3 . . . ) and/or route that field data to the tracer 124 of FIG. 1A. In one example, the microcode may be adapted such that the signal operations are performed in a certain order such that the tracer 124 receives the specific field data for specific elements in a certain order. The tracer 124 may then format (e.g., packetize or package) the elements of the data record to generate a PEBS record packet or a group of record packets corresponding to the elements of the PEBS record. In one example, the tracer 124 notes the type of field from a header of each element so as to optionally order the elements the same way for each group of record packets. The formatting may be performed by receiving each value of a plurality of elements from an event-based sampler, identifying each element by a header of the element, and wrapping the plurality of elements together to form the PEBS record packet. In one embodiment, the elements are arranged in a certain order.

The formatting to create the PEBS record packet may also include combining the header of each element into a header of the record packet that is created, to identify payload data within the record packet. For example, the header of "Applicable Counters" in FIG. 2 may be listed first in the header of the PEBS packet where the corresponding field data is to be positioned first within the payload data. Similarly, the header of "EventingIP" may be listed second in the header where the instruction pointer value (field data) is to be positioned second in the payload data, and so forth down the list in the header of each corresponding payload for the PEBS packet. The tracer 124 may then insert the group of record packets between ones of a plurality of trace data packets, with the option of the tracer 124 first inserting a TSC packet before the group of record packets, to generate a combined packet stream that may be routed to at least one of a memory buffer or a port controlled by the tracer.

In one embodiment, it is possible to disable most of PT tracing (e.g., eliminate control flow packets and other types of packets), yielding a trace stream that is made up of almost entirely PEBS record packets. This may reduce the output stream size and limit the collected information to just the kind of information desired, where processor trace data may not be necessary or where there is less room or bandwidth for the PT stream data packets. The disabling of the PT tracing may be performed selectively through settings of the trace register 126 in one embodiment.

With further reference to FIG. 1B, the present disclosure also proposes the use of additional model-specific registers (MSR's). In one embodiment, each VM 190A, 190B, or 190C has its own set of MSR's so each VM can perform its own sampling separate from the others. In one embodiment, the reload register 134 may hold the value "n" that is the number of times a particular event type is to occur before causing the event-based sampler 128 to dump a PEBS record. The reload value may, for example, be −1,000. The PMC register 132 may contain the PEBS counter that may be incremented each time the particular event type occurs. Upon reset of the processor 112 or overflow of the PMC register 132, the reload value from the reload register 134 may be stored in the PMC register 132, which then begins again to be incremented upon each event occurrence.

More particularly, when the PEBS counter of the PMC register 132 overflows, e.g., reaches zero ("0") as a predetermined trigger value in this example, and upon occurrence of the particular event type a next time after overflow, the reload value may be reloaded into the PMC register 132. Furthermore, upon the PMC register overflow, the event-based sampler 128 may perform the signal operations to generate the event-based values for elements within the PEBS record as previously discussed. The reload register 134 may contain a different reload value for different events (and optionally a different VM) and thus be customized to periodicity of PEBS record generation for different types of events.

Despite being integrated within the PT trace stream, the PEBS record packets may still be handled with PEBS-specific filtering that is different from PT filtering. For example, PEBS filtering may allow the processor 112 to determine what was supposed to happen before execution at a particular filter point in a program, and what was supposed to happen after that filter point. Tracking of that filter point in the program may be performed by careful tracking of the PEBS counter (as just discussed) in light of what counts as "an event" for purposes incrementing the counter. Execution of the virtual machine may also be paused at this point to read out data of the event at that filter point.

In one embodiment, the processor 112 may also control and refer to VMCS registers to help the VMM 180 to get the right data from the operating system on a VM-exit and to properly start up VM operation again on a VM-entry, all while not causing loss of PEBS record packets. For example, in one setting for system-wide profiling, the processor 112 may enable tracing of all activity and thus not do anything between transitions in and out of any particular virtual machine. In other words, there is no switching at these transitions because both the VMM 180 and the host can be traced. If, however, the virtualization server 110 is set in guest-only profiling, the processor 112 may be configured to trace only the VMM 180, in which case the event-based sampler 128 may selectively turn off PEBS upon a VM-exit and turn PEBS back on upon VM-entry.

Accordingly, the trace register 126 may be set to selectively turn trace on and off, which would effectively shut down all tracing and the PEBS record packets routing within the PT stream. Furthermore, the PERF_GLOBAL_CTRL register 138 may be controlled so as to control the counter of the PMC register 132. If the PERF_GLOBAL_CTRL register 138 is not set (e.g., contains a zero), for example, the counters are turned off and no PEBS records may be generated. Furthermore, the DEBUG_CTRL register 142 may be set to control last branch entry (LBR), which when cleared, will also turn off generation of LBR events within the PEBS record packets. The VMCS control of the processor 112 (e.g., through the VMCS register 143) may allow the DEBUG_CTRL register 142 to not be cleared upon VM-exit under system-wide control, to leave LBR enabled going from host to guest, for example. Other MSRs may also be used to selectively turn off functionality that drives generation of values for other PEBS fields.

With further reference to FIG. 1A, the PT decoder 194 may decode the interleaved packet stream (including the trace data packets and the PEBS record packets) as to decode the PEBS record packets. For full decode, including determination of the context of each packet within processor execution, the PT decoder 194 may access the program binaries and OS driver events from the database 119. A comparison of metadata within the program binaries and the OS driver events with relation to the event-based instruction pointer from the PEBS record may help to determine a location in the program binary of a function that has contributed to the data in the PEBS record packet. The OS driver events may be trace data from the operation of the operating system that informs execution states of the OS.

More specifically, the PT decoder 194 may retrieve and inspect metadata from the program binaries, the OS driver events, and analyze this data in relation to trace data packets (such as TNT, PIP, TIP and FUP packets) and a group of PEBS record packets corresponding to a captured instruction pointer (IP). For example, if a PIP packet indicates a program change and nearby, down the PT stream, there are PEBS record packets, the PT decoder 194 may correlate the change in program execution to the PEBS data record generation that was packetized as the PEBS record packets. The PT decoder 194 may also use the IP from the group PEBS record packets in conjunction with the metadata to further determine an identity of the function or thread being executed at the time the particular event type occurred. All of this contextual-type information may provide needed context for debugging and performance monitoring applications or tools that receive the information along with the trace data and PEBS record packets.

Figure 4A:
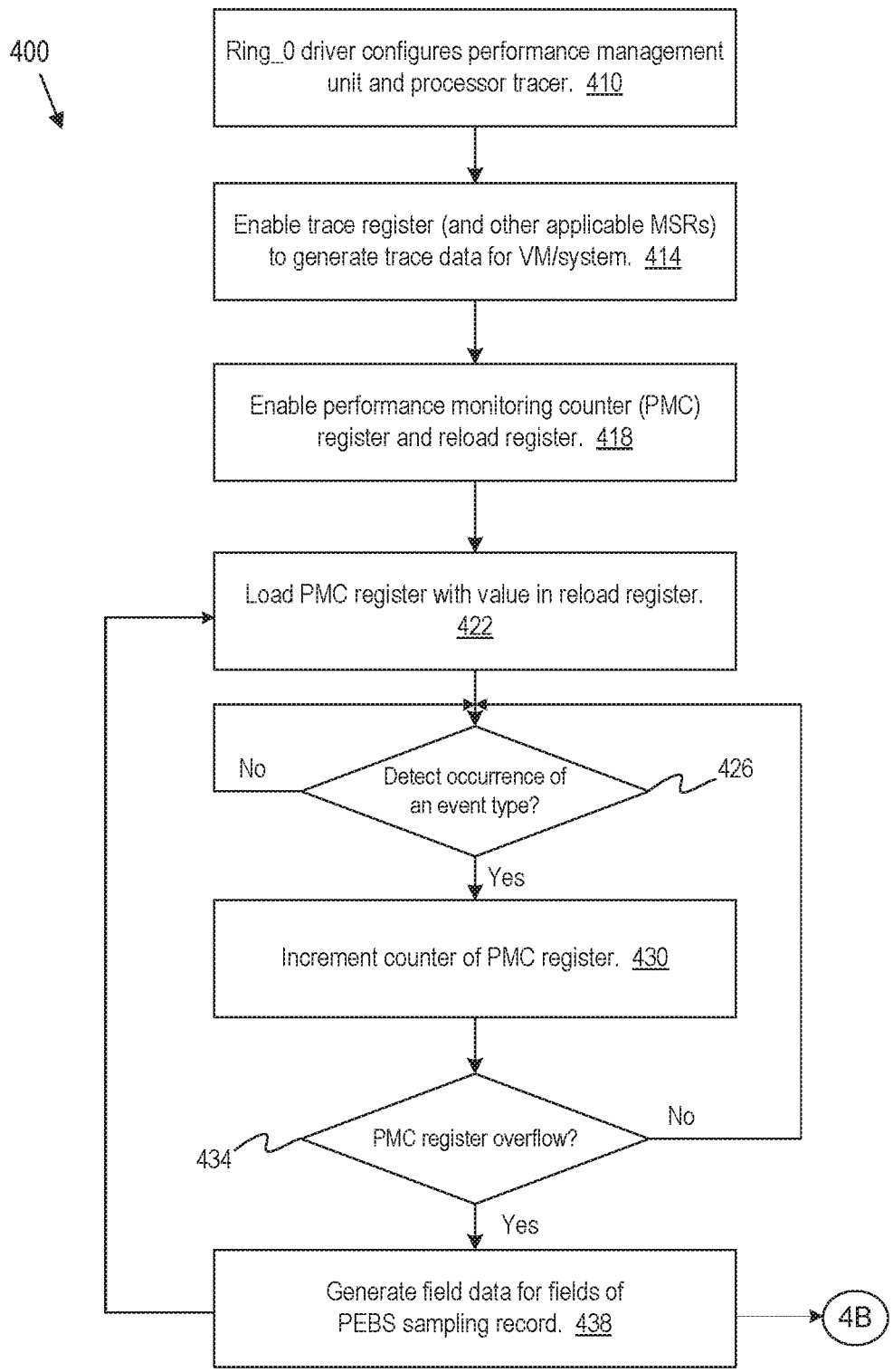
FIG. 4A is a flow diagram illustrating a method of configuring a virtualization system for PEBS record generation, according to an embodiment of the disclosure.

FIG. 4A is a flow diagram illustrating a method 400 of configuring the virtualization system 100 for PEBS data record generation, according to an embodiment of the disclosure. The method 400 may be performed by a process system that may comprise hardware (e.g., circuitry, dedicated logic, and/or programmable logic), software (e.g., instructions executable on a computer system to perform hardware simulation), or a combination thereof. In an illustrative example, the method 400 may be performed by the virtualization system 100 of FIG. 1A, and thus may be performed on a virtual machine or on a system-wide basis. The method 400 and/or each of its functions, routines, subroutines, or operations may be performed by one or more processors of the virtualization server 110, such as the processor 112, executing the method. Two or more functions, routines, subroutines, or operations of the method 400 may be performed in parallel or in an order which may differ from the order described above.

Referring to FIG. 4A, the method 400 may start where the processor employs a Ring_0 driver to configure a performance monitoring unit and a processor tracer (410). The method may continue where the processor implementing the method may enable a trace register (and other applicable MSRs as just discussed) to generate trace data for a virtual machine, and optionally, for an entire system that may run multiple virtual machines (414). The method may continue where the processor implementing the method may enable a performance monitoring counter (PMC) register and reload register so that precise event-based sampling (PEBS) may be executed (418). The method may continue where the processor implementing the method may load the PMC register with a value in the reload register (422).

The method 400 of FIG. 4A may continue where the processor implementing the method may determine whether an event of a certain type is detected as occurring with the processor's execution of an instruction, which may be executed on a virtual machine in one embodiment (426). The method may continue where the processor implementing the method may increment the counter of the PMC register upon detecting occurrence of the event of the certain type (430). The method may continue where the processor implementing the method may determine whether the counter of the PMC register overflows (434). If no, the method may continue where the processor implementing the method may loop back to block 426 to continue attempting to detect occurrence of the event. If yes, the method may continue where the processor implementing the method may generate field data for elements of a PEBS sampling record, e.g., by executing microcode to perform signal operations as discussed previously (438). The method may then loop back to load the PMC register with the value in the reload register (422), to begin again the PEBS counter cycle, counting down to the next PEBS event.

Figure 4B:
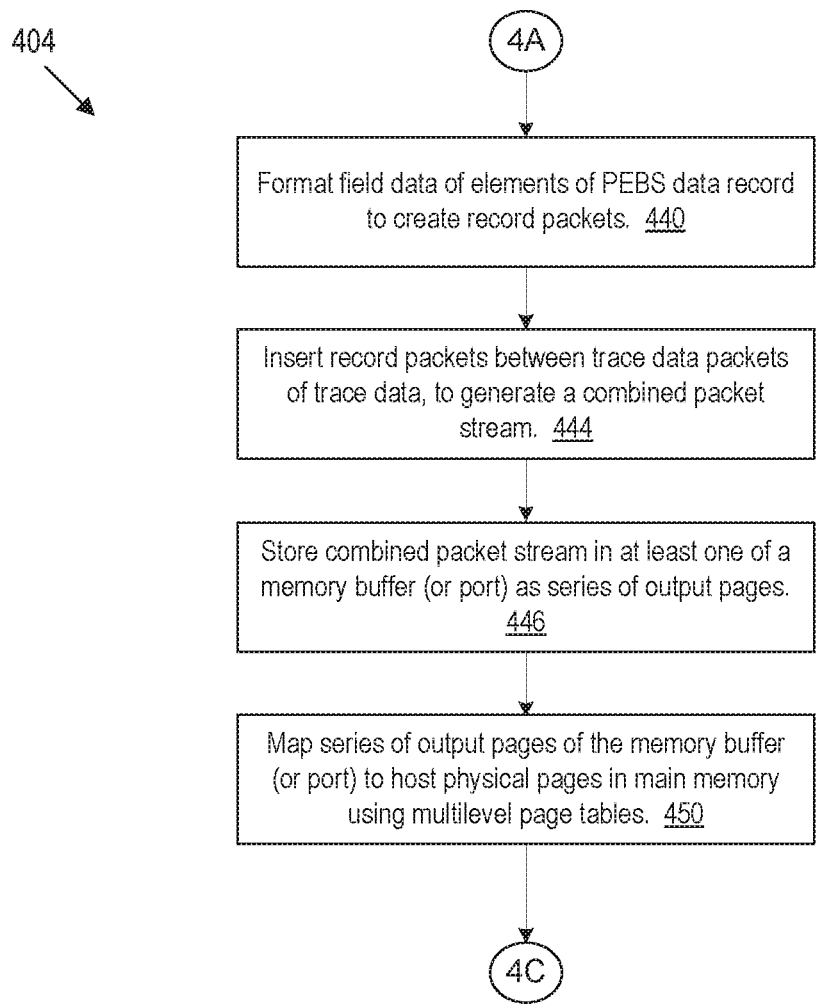
FIG. 4B is a flow diagram illustrating a method of formatting and outputting PEBS records as PEBS record packets, according to one embodiment of the disclosure.

FIG. 4B is a flow diagram illustrating a method 404 of formatting and outputting PEBS records as PEBS record packets, according to one embodiment of the disclosure. The method 404 may be performed by a processing system that may comprise hardware (e.g., circuitry, dedicated logic, and/or programmable logic), software (e.g., instructions executable on a computer system to perform hardware simulation), or a combination thereof. In an illustrative example, the method 404 may be performed by the virtualization system 100 of FIG. 1A, and thus may be performed on a virtual machine or on a system-wide basis. The method 404 and/or each of its functions, routines, subroutines, or operations may be performed by one or more processors of the virtualization server 110, such as the processor 112, executing the method. Two or more functions, routines, subroutines, or operations of the method 404 may be performed in parallel or in an order which may differ from the order described above.

Referring to FIG. 4B, the method 404 may start with a processor tracer of the processor formatting field data of elements of the PEBS sampling record (generated in block 438 of the method of FIG. 4A) to create a group of PEBS record packets (440). The formatting may be performed by receiving field data for each element of a plurality of elements from an event-based sampler, identifying each element by a header, and wrapping (e.g., packaging or packetizing) the plurality of elements together to form the PEBS record packet. Alternatively, the processor tracer may format the field data of the elements into a group of individual PEBS packets, optionally ordered in a particular sequence. The formatting may also include using the header of each element as a header of a corresponding record packet, to identify payload data within the record packet.

The method may continue where the processor tracer may insert the group of record packets between trace data packets of trace data generated from PT tracing, to generate a combined packet stream (as explained with reference to and shown in FIGS. 2-3) (444). The insertion of the record packet may be performed generally chronologically at the time of a PEBS data dump, but may be strategically inserted after generation and insertion of a TSC packet into the stream, to identify a precise time of insertion. The method may continue where the processor implementing the method may store the combined packet stream as a series of output pages to at least one of a memory buffer (or a port) controlled by the processor tracer (446). The method may continue where the processor implementing the method may execute a VMM, when in a guest profiling mode, to map the series of output pages of the memory buffer (or port) to host physical pages of main memory using Extended Page Tables (MPT) or similar mapping structure (450).

Figure 4C:
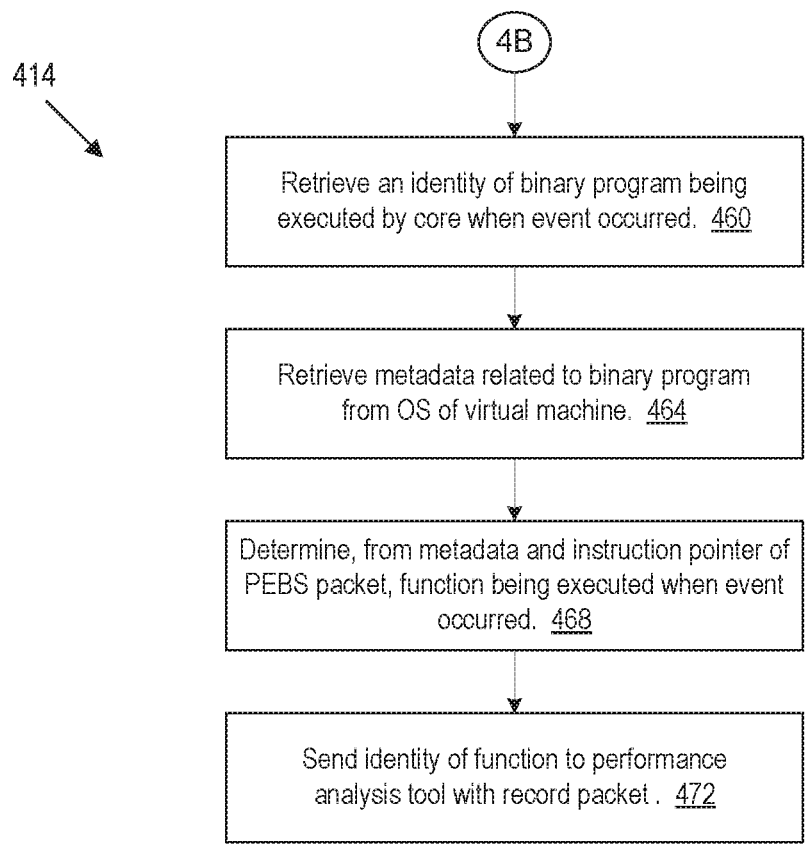
FIG. 4C is a flow diagram illustrating a method of analyzing PEBS record packets for debugging and troubleshooting purposes, according to one embodiment of the disclosure.

FIG. 4C is a flow diagram illustrating a method 414 of analyzing PEBS record packets for debugging and troubleshooting purposes, according to one embodiment of the disclosure. The method 414 may be performed by a processing system that may comprise hardware (e.g., circuitry, dedicated logic, and/or programmable logic), software (e.g., instructions executable on a computer system to perform hardware simulation), or a combination thereof. In an illustrative example, the method 414 may be performed by the virtualization system 100 of FIG. 1A, and thus may be performed on a virtual machine or on a system-wide basis. The method 414 and/or each of its functions, routines, subroutines, or operations may be performed by one or more processors of the virtualization server 110, such as the processor 112, executing the method, or a debugging or performance analysis tool as discussed herein. Two or more functions, routines, subroutines, or operations of the method 414 may be performed in parallel or in an order which may differ from the order described above.

Referring to FIG. 4C, the method 414 may start with a processor implementing the method may retrieve, from a VMM, an identity of a binary program being executed by a processor when an event of a certain type occurred (460). The method may continue where the processor implementing the method may retrieve metadata related to the binary program from an operating system of the virtual machine, wherein the metadata references a function being executed at or before the occurrence of the determined event (464).

The method may continue where the processor implementing the method may determine, from the metadata and the instruction pointer, an identity of the function being executed (468). The method may continue where the processor implementing the method may send the identity of the function being executed to a performance analysis tool with the record packet (472).

Figure 5:
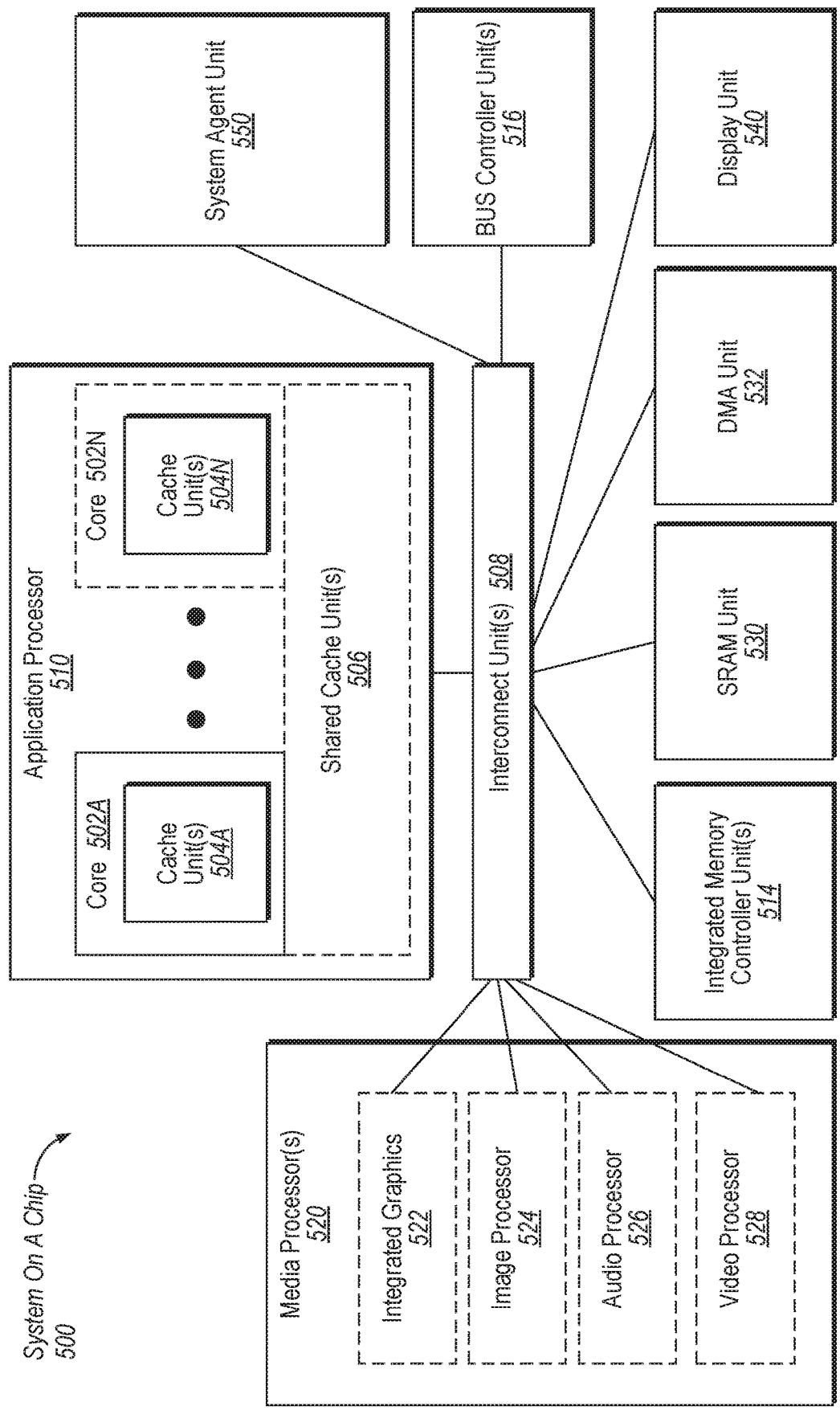
FIG. 5 is a block diagram of a system on chip (SoC), in accordance with an embodiment of the present disclosure.

FIG. 5 is a block diagram of a SoC 500 in accordance with an embodiment of the present disclosure. Dashed lined boxes are optional features on more advanced SoCs. In FIG. 5, an interconnect unit(s) 508 is coupled to: an application processor 510 which includes a set of one or more cores 502A-502N and shared cache unit(s) 506; a system agent unit 550; a bus controller unit(s) 516; an integrated memory controller unit(s) 514; a set of one or more media processors 520 which may include integrated graphics logic 522, an image processor 524 for providing still and/or video camera functionality, an audio processor 526 for providing hardware audio acceleration, and a video processor 528 for providing video encode/decode acceleration; an static random access memory (SRAM) unit 530; a direct memory access (DMA) unit 532; and a display unit 540 for coupling to one or more external displays. In one embodiment, the application processor 510 includes or is the processor 112 of FIG. 1.

The memory hierarchy includes one or more levels of cache within the cores, a set of one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. In some embodiments, one or more of the cores 502A-502N are capable of multi-threading.

The system agent 550 includes those components coordinating and operating cores 502A-502N. The system agent unit 550 may include for example a power control unit (PCU) and a display unit. The PCU may be or include logic and components needed for regulating the power state of the cores 502A-502N and the integrated graphics logic 522. The display unit 540 is for driving one or more externally connected displays.

The cores 502A-502N may be homogenous or heterogeneous in terms of architecture and/or instruction set. For example, some of the cores 502A-502N may be in order while others are out-of-order. As another example, two or more of the cores 502A-502N may be capable of execution of the same instruction set, while others may be capable of executing only a subset of that instruction set or a different instruction set.

The application processor 510 may be a general-purpose processor, such as a Core™ i3, i5, i7, 2 Duo and Quad, Xeon™, Xeon-Phi™, Itanium™, XScale™ or StrongARM™ processor, which are available from Intel Corporation, of Santa Clara, Calif. Alternatively, the application processor 510 may be from another company, such as ARM Holdings, Ltd., MIPS, etc. The application processor 510 may be a special-purpose processor, such as, for example, a network or communication processor, compression engine, graphics processor, co-processor, embedded processor, or the like. The application processor 510 may be implemented on one or more chips. The application processor 510 may be a part of and/or may be implemented on one or more substrates using any of a number of process technologies, such as, for example, BiCMOS, CMOS, or NMOS.

Figure 6:
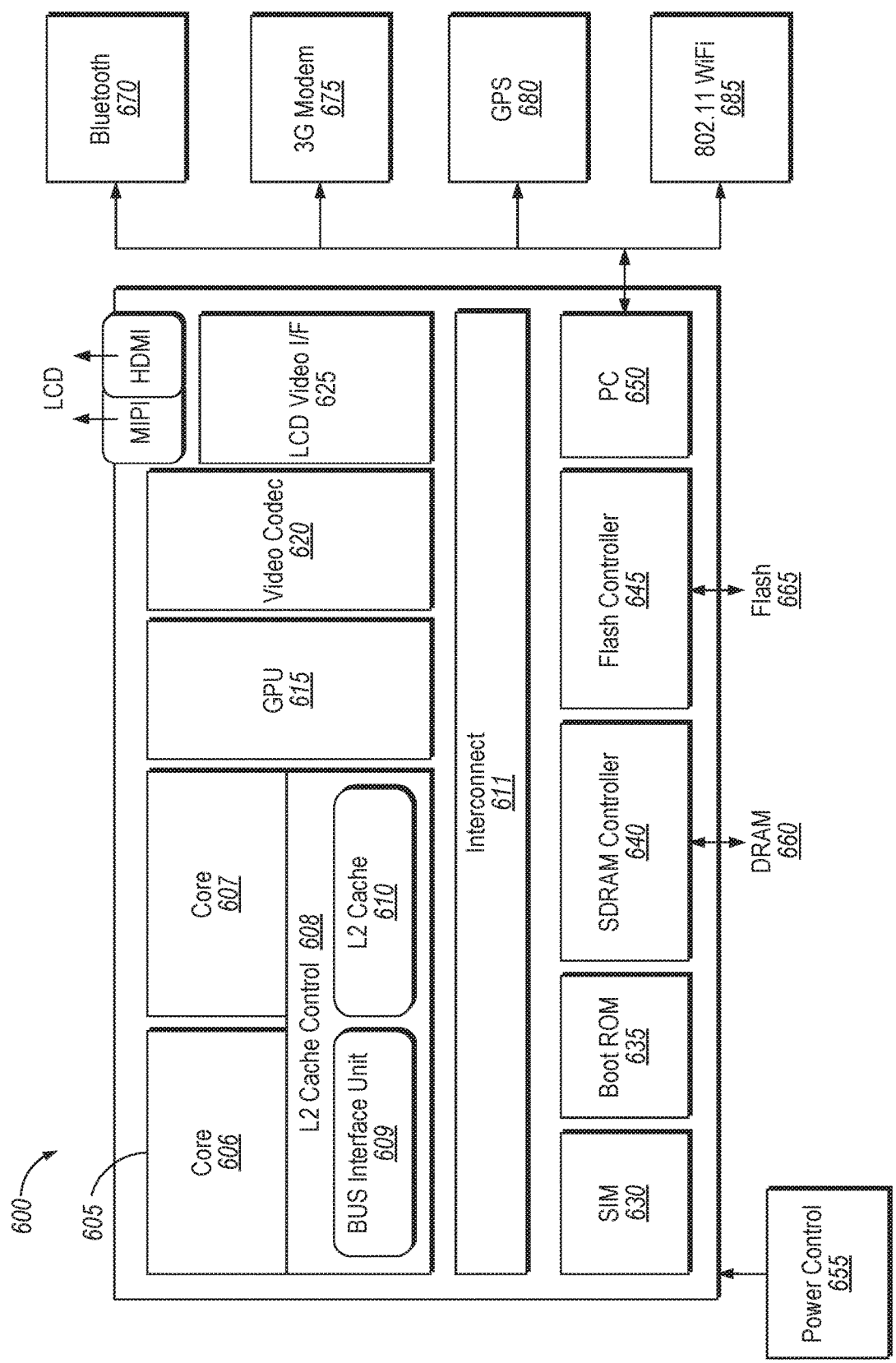
FIG. 6 is a block diagram of an embodiment of a system on-chip (SoC) design, in accordance with another embodiment of the present disclosure.

FIG. 6 is a block diagram of an embodiment of a system on-chip (SOC) design in accordance with the present disclosure. As a specific illustrative example, SOC 600 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In one embodiment, the SOC 600 may include the processor 112 of FIG. 1 or may include various features or components of the processor 112.

Here, SOC 600 includes 2 cores-606 and 607. Cores 606 and 607 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 606 and 607 are coupled to cache control 608 that is associated with bus interface unit 609 and L2 cache 610 to communicate with other parts of SOC 600. Interconnect 611 includes an on-chip interconnect, such as an IOSF, AMBA, or other interconnect discussed above, which potentially implements one or more aspects of the described disclosure.

Interconnect 611 provides communication channels to the other components, such as a Subscriber Identity Module (SIM) 630 to interface with a SIM card, a boot ROM 635 to hold boot code for execution by cores 606 and 607 to initialize and boot SOC 600, a SDRAM controller 640 to interface with external memory (e.g. DRAM 660), a flash controller 645 to interface with non-volatile memory (e.g. Flash 665), a peripheral control 650 (e.g. Serial Peripheral Interface) to interface with peripherals, video codecs 620 and Video interface 625 to display and receive input (e.g. touch enabled input), GPU 615 to perform graphics related computations, etc. Any of these interfaces may incorporate aspects of the disclosure described herein.

In addition, the system 600 illustrates peripherals for communication, such as a Bluetooth module 670, 3G modem 675, GPS 680, and Wi-Fi 685. Note as stated above, a UE includes a radio for communication. As a result, these peripheral communication modules are not all required. However, in a UE, some form a radio for external communication is to be included.

Figure 7:
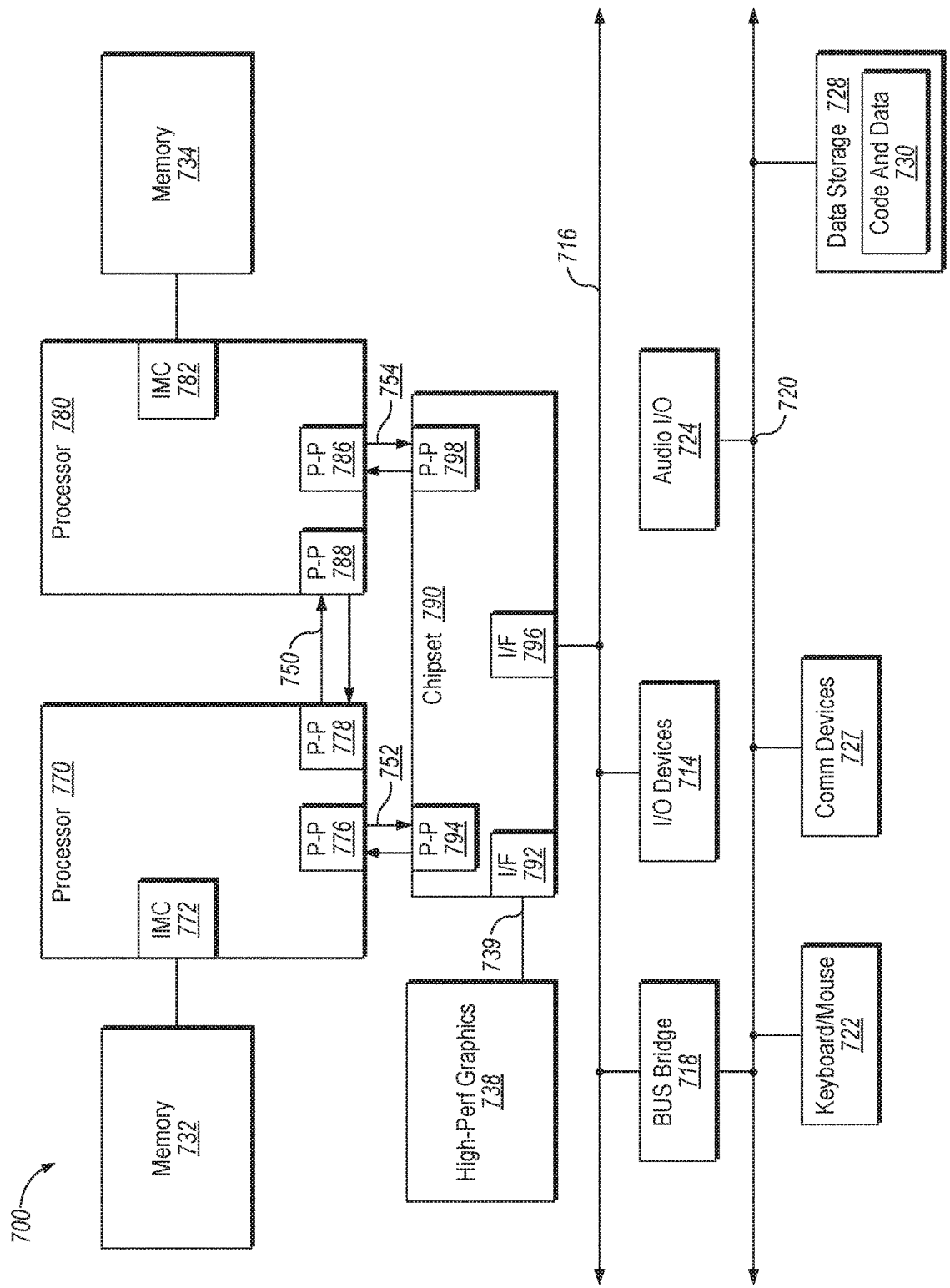
FIG. 7 is a block diagram of a computer system, according to one embodiment of the present disclosure.

FIG. 7 is a block diagram of a multiprocessor system 700 in accordance with an implementation. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 112 of FIG. 1. As shown in FIG. 7, each of processors 770 and 780 may be multicore processors, including first and second processor cores, although potentially many more cores may be present in the processors. A processor core may also be referred to as an execution core.

While shown with two processors 770, 780, it is to be understood that the scope of the present disclosure is not so limited. In other implementations, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interconnect 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, and 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

FIG. 8A is a block diagram illustrating an in-order pipeline and a register renaming stage, out-of-order issue/execution pipeline implemented by core 890 of FIG. 8B (which may be include in a processor). FIG. 8B is a block diagram illustrating an in-order architecture core and a register renaming logic, out-of-order issue/execution logic that may be included in a processor according to at least one embodiment of the invention. The solid lined boxes in FIG. 8A illustrate the in-order pipeline, while the dashed lined boxes illustrates the register renaming, out-of-order issue/execution pipeline. Similarly, the solid lined boxes in FIG. 8A illustrate the in-order architecture logic, while the dashed lined boxes illustrates the register renaming logic and out-of-order issue/execution logic. In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 810, an execute stage 816, a write back/memory write stage 818, an exception handling stage 822, and a commit stage 824. In one embodiment, the processor 112 of FIG. 1 may include some or all of the functionality of the core 890.

FIG. 8B is a block diagram illustrating an in-order architecture core and a register renaming logic, out-of-order issue/execution logic that may be included in a processor according to at least one embodiment of the disclosure. In FIG. 8B, arrows denote a coupling between two or more units and the direction of the arrow indicates a direction of data flow between those units. FIG. 8B shows processor core 890 including a front end unit 830 coupled to an execution engine unit 850, and both are coupled to a memory unit 870.

The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 834 is further coupled to a level 2 (L2) cache unit 876 in the memory unit 870. The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858.

Each of the physical register file(s) units 858 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 858 is overlapped by the retirement unit 854 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 854 and the physical register file(s) unit(s) 858 are coupled to the execution cluster(s) 860. The execution cluster(s) 860 includes a set of one or more execution units 162 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access units 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch unit 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 810; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 834/874 and the shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9:
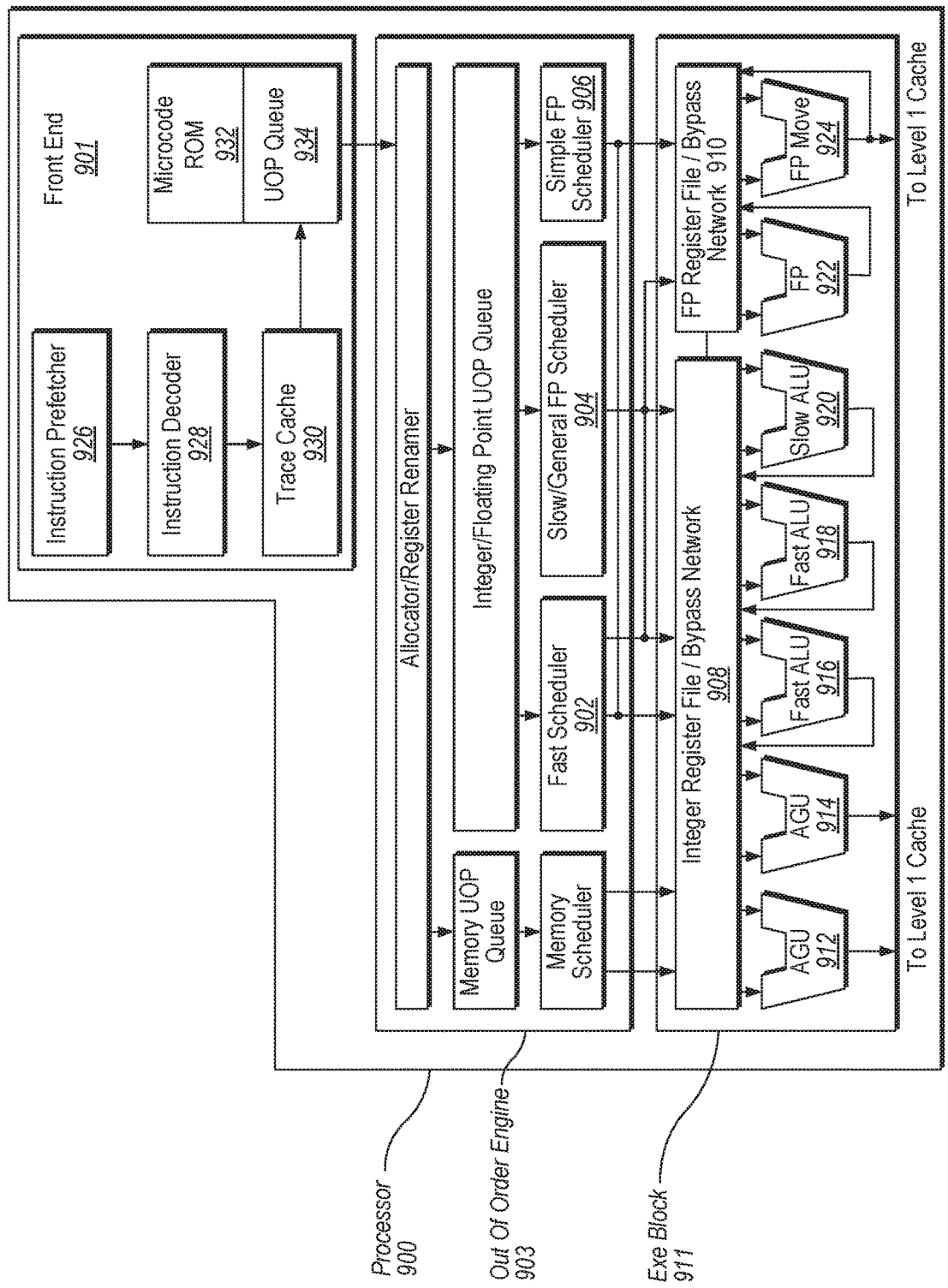
FIG. 9 is a block diagram of the micro-architecture for a processor that includes logic circuits to perform instructions, in accordance with one embodiment of the present invention.

FIG. 9 is a block diagram of the micro-architecture for a processor 900 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 901 is the part of the processor 900 that fetches instructions to be executed and prepares them to be used later in the processor pipeline. The front end 901 may include several units. In one embodiment, the instruction prefetcher 926 fetches instructions from memory and feeds them to an instruction decoder 928 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 930 takes decoded uops and assembles them into program ordered sequences or traces in the uop queue 934 for execution. When the trace cache 930 encounters a complex instruction, the microcode ROM 932 provides the uops needed to complete the operation. In one embodiment, the processor 112 of FIG. 1 may include some or all of the components and functionality of the processor 900.

Some instructions are converted into a single micro-op, whereas others need several micro-ops to complete the full operation. In one embodiment, if more than four micro-ops are needed to complete an instruction, the decoder 928 accesses the microcode ROM 932 to do the instruction. For one embodiment, an instruction can be decoded into a small number of micro ops for processing at the instruction decoder 928. In another embodiment, an instruction can be stored within the microcode ROM 932 should a number of micro-ops be needed to accomplish the operation. The trace cache 930 refers to an entry point programmable logic array (PLA) to determine a correct micro-instruction pointer for reading the micro-code sequences to complete one or more instructions in accordance with one embodiment from the micro-code ROM 932. After the microcode ROM 932 finishes sequencing micro-ops for an instruction, the front end 901 of the machine resumes fetching micro-ops from the trace cache 930.

The out-of-order execution engine 903 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 902, slow/general floating point scheduler 904, and simple floating point scheduler 906. The uop schedulers 902, 904, 906, determine when a uop is ready to execute based on the readiness of their dependent input register operand sources and the availability of the execution resources the uops need to complete their operation. The fast scheduler 902 of one embodiment can schedule on each half of the main clock cycle while the other schedulers can only schedule once per main processor clock cycle. The schedulers arbitrate for the dispatch ports to schedule uops for execution.

Register files 908, 910, sit between the schedulers 902, 904, 906, and the execution units 912, 914, 916, 918, 920, 922, and 924 in the execution block 911. There is a separate register file 908, 910, for integer and floating point operations, respectively. Each register file 908, 910, of one embodiment also includes a bypass network that can bypass or forward just completed results that have not yet been written into the register file to new dependent uops. The integer register file 908 and the floating point register file 910 are also capable of communicating data with the other. For one embodiment, the integer register file 908 is split into two separate register files, one register file for the low order 32 bits of data and a second register file for the high order 32 bits of data. The floating point register file 910 of one embodiment has 128 bit wide entries because floating point instructions typically have operands from 64 to 128 bits in width.

The execution block 911 contains the execution units 912, 914, 916, 918, 920, 922, 924, where the instructions are actually executed. This section includes the register files 908, 910, that store the integer and floating point data operand values that the micro-instructions need to execute. The processor 900 of one embodiment is comprised of a number of execution units: address generation unit (AGU) 912, AGU 914, fast ALU 916, fast ALU 918, slow ALU 920, floating point ALU 922, floating point move unit 924. For one embodiment, the floating point execution blocks 922, 924, execute floating point, MMX, SIMD, and SSE, or other operations. The floating point ALU 922 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 916, 918. The fast ALUs 916, 918, of one embodiment can execute fast operations with an effective latency of half a clock cycle. For one embodiment, most complex integer operations go to the slow ALU 920 as the slow ALU 920 includes integer execution hardware for long latency type of operations, such as a multiplier, shifts, flag logic, and branch processing. Memory load/store operations are executed by the AGUs 912, 914. For one embodiment, the integer ALUs 916, 918, 920, are described in the context of performing integer operations on 64 bit data operands. In alternative embodiments, the ALUs 916, 918, 920, can be implemented to support a variety of data bits including 16, 32, 128, 256, etc. Similarly, the floating point units 922, 924, can be implemented to support a range of operands having bits of various widths. For one embodiment, the floating point units 922, 924, can operate on 128 bits wide packed data operands in conjunction with SIMD and multimedia instructions.

In one embodiment, the uops schedulers 902, 904, 906, dispatch dependent operations before the parent load has finished executing. As uops are speculatively scheduled and executed in processor 900, the processor 900 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 10:
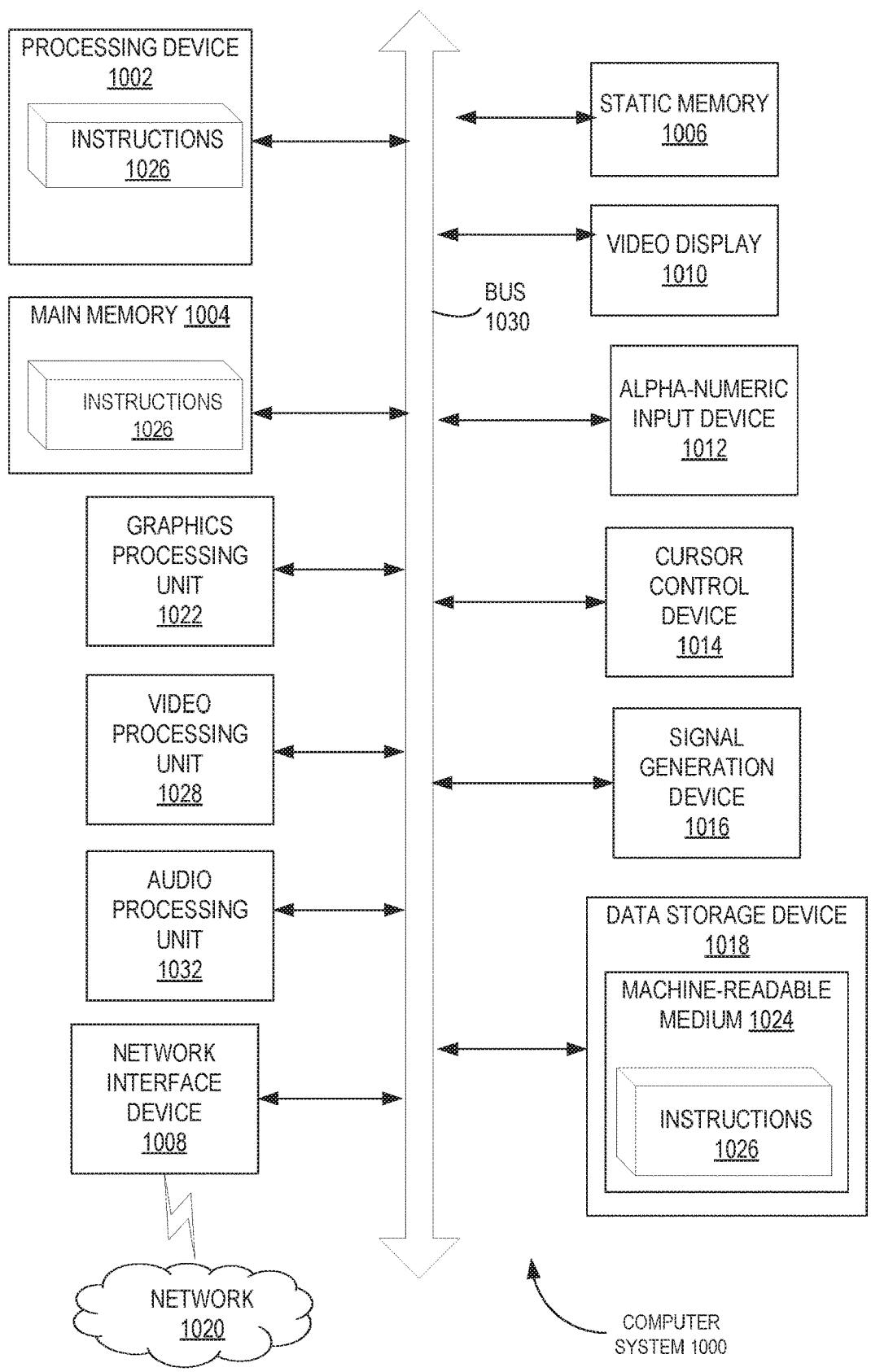
FIG. 10 illustrates a diagrammatic representation of a machine in the example form of a computer system within which a set of instructions, for causing the machine to perform any one or more of the methodologies discussed herein, may be executed.

FIG. 10 illustrates a diagrammatic representation of a machine in the example form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1000 includes a processing device 1002, a main memory 1004 (e.g., read-only memory (ROM), flash memory, dynamic random access memory (DRAM) (such as synchronous DRAM (SDRAM) or DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In one embodiment, processing device 1002 may include one or processing cores. The processing device 1002 is configured to execute the instructions 1026 of a mirroring logic for performing the operations discussed herein. In one embodiment, the processing device 1002 may correspond to the processor 112 of FIG. 1A.

The computer system 1000 may further include a network interface device 1008 communicably coupled to a network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a signal generation device 1016 (e.g., a speaker), or other peripheral devices. Furthermore, computer system 1000 may include a graphics processing unit 1022, a video processing unit 1028, and an audio processing unit 1032. In another embodiment, the computer system 1000 may include a chipset (not illustrated), which refers to a group of integrated circuits, or chips, that are designed to work with the processing device 1002 and controls communications between the processing device 1002 and external devices. For example, the chipset may be a set of chips on a motherboard that links the processing device 1002 to very high-speed devices, such as main memory 1004 and graphic controllers, as well as linking the processing device 1002 to lower-speed peripheral buses of peripherals, such as USB, PCI or ISA buses.

The data storage device 1018 may include a computer-readable storage medium 1024 on which is stored instructions 1026 embodying any one or more of the methodologies of functions described herein. The instructions 1026 may also reside, completely or at least partially, within the main memory 1004 and/or within the processing device 1002 during execution thereof by the computer system 1000; the main memory 1004 and the processing device 1002 also constituting computer-readable storage media.

The computer-readable storage medium 1024 may also be used to store instructions 1026 utilizing logic and/or a software library containing methods that call the above applications. While the computer-readable storage medium 1024 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the embodiments are herein described with reference to a processor or processing device, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The following examples pertain to further embodiments.

Example 1 is a processor comprising: 1) a core having a memory buffer and that is to execute an instruction within a virtual machine, wherein the core executes a virtual machine monitor (VMM) to manage the virtual machine and further comprises: a) a processor tracer including first circuitry to capture trace data produced by execution of the instruction and to format the trace data as a plurality of trace data packets; b) an event-based sampler including second circuitry to generate field data for elements of a sampling record in response to occurrence of an event of a certain type as a result of execution of the instruction; wherein the first circuitry is further to, upon receipt of the field data from the second circuitry: i) format the field data into a group of record packets corresponding to the elements; ii) insert the group of record packets between ones of the plurality of trace data packets of the trace data, to generate a combined packet stream; and iii) store the combined packet stream in the memory buffer as a series of output pages using guest physical addresses; and wherein the VMM is to, when in a guest profiling mode, map the series of output pages of the memory buffer to host physical pages of main memory using multilevel page tables.

In Example 2, the processor of Example 1, wherein the core is further to generate a page fault when accessing a guest physical address for an output page of the series of output pages that is not mapped to a host physical address of the main memory, and wherein the VMM is further to pause the virtual machine to handle the page fault.

In Example 3, the processor of Example 1, wherein the VMM is further to, when in a system-wide profiling mode, directly address the series of output pages as host physical pages in the main memory, and wherein the memory buffer is one of a Table of Physical Addresses (ToPA) or a Single Range memory.

In Example 4, the processor of Example 1, the group of record packets includes an instruction pointer value corresponding to an address of the instruction that has caused the occurrence of the event, and wherein the core is further to execute a trace decoder to: 1) retrieve, from one of the VMM or an operating system of the virtual machine, an identity of a binary program being executed on the virtual machine during the occurrence of the event; 2) retrieve metadata related to the binary program from the operating system, wherein the metadata references a function being executed at or before the occurrence of the event; and 3) determine, from the metadata and the instruction pointer, an identity of the function being executed; and 4) send the identity of the function being executed to a performance analysis tool with the group of record packets.

In Example 5, the processor of Example 1, wherein to store the combined packet stream in the memory buffer as the series of output pages, the first circuitry is to: 1) while filling a first output page, prefetch a second output page; 2) test whether the second output page is mapped to a host physical page of the main memory; and 3) trigger a virtual machine exit to request the VMM to map the second output page to the main memory responsive to detecting that the second output page is not mapped to the main memory.

In Example 6, the processor of Example 1, wherein the second circuitry is further to, upon detection of the event, trigger a pause of execution of the virtual machine while generating the field data for the fields of the sampling record.

In Example 7, the processor of Example 1, further comprising a second memory buffer comprising a port that is coupled to an output pin that connects to one of a debugger or off-chip analyzer.

In Example 8, the processor of Example 1, further comprising a performance monitoring interrupt (PMI) register, which is to cause an interrupt in the core upon detecting the group of record packets, to enable transfer of control of the virtual machine to a debugger tool or analyzer that retrieves the group of record packets.

In Example 9, the processor of Example 1, wherein each of the group of record packets includes a header indicating a type of payload data as being event-based data.

In Example 10, the processor of Example 1, wherein the event-based sampler is further to execute one of hardware or microcode to perform a series of signal operations that transmit the field data for the elements of the sampling record in a predetermined order to the processor tracer.

Various embodiments can have different combinations of the structural features described above. For instance, all optional features of the computing system described above can also be implemented with respect to the method or process described herein and specifics in the examples can be used anywhere in one or more embodiments.

Example 11 is a system comprising: 1) a memory; and 2) a processor to execute and retire a plurality of instructions on a virtual machine, the processor operatively coupled to the memory, wherein the processor comprises: a) a reload register to store a reload value; b) a performance monitoring counter (PMC) register coupled to the reload register; c) an event-based sampler operatively coupled to the reload register and the PMC register, wherein the event-based sampler includes first circuitry to: i) load the reload value into the PMC register; ii) increment the PMC register after detecting each occurrence of an event of a certain type as a result of execution of the plurality of instructions; and iii) upon detecting an occurrence of the event after the PMC register reaches a predetermined trigger value: iv) execute microcode to generate field data for elements within a sampling record, wherein the field data relates to a current processor state of execution; and v) reload the reload value from the reload register into the PMC register.

In Example 12, the system of Example 11, wherein the processor further comprises a processor tracer including second circuitry to capture trace data produced by execution of the plurality of instructions and to format the trace data as a plurality of trace data packets.

In Example 13, the system of Example 12, wherein the processor further includes a memory buffer for use by the virtual machine, and the second circuitry is further to: 1) format the field data into a group of record packets corresponding to the elements; 2) interleave the group of record packets between ones of the plurality of trace data packets of the trace data, to generate a combined packet stream; and 3) store the combined packet stream in the memory buffer as a series of output pages.

In Example 14, the system of Example 13, wherein the processor is further to execute a virtual machine monitor (VMM), and wherein to store the combined packet stream in the memory buffer as the series of output pages, the second circuitry is to: 1) while filling a first output page, prefetch a second output page; 2) test whether the second output page is mapped to a host physical page of the main memory; and 3) trigger a virtual machine exit to request the VMM to map the second output page to the main memory responsive to detecting that the second output page is not mapped to the main memory.

In Example 15, the system of Example 12, wherein the event-based sampler is further to execute the microcode to perform a series of signal operations that transmit the field data for the element of the sampling record in a predetermined order to the processor tracer.

In Example 16, the system of Example 11, further comprising a virtual machine control structure (VMCS) register, that when enabled, is to cause the event-based sampler to remain enabled upon exiting the virtual machine while the processor is in a system-wide profiling mode for event-based sampling.

Various embodiments can have different combinations of the structural features described above. For instance, all optional features of the computing system described above can also be implemented with respect to the method or process described herein and specifics in the examples can be used anywhere in one or more embodiments.

Example 17 is a method comprising: 1) executing, by a processor core, a plurality of instructions for a virtual machine; 2) capturing, using a processor tracer of the processor core, trace data from execution of the plurality of instructions; 3) formatting, using the processor tracer, the trace data into a plurality of trace data packets; 4) generating, using an event-based sampler of the processor core, field data for elements of a sampling record in response to occurrence of an event of a certain type as a result of execution of the plurality of instructions; 5) formatting, using the processor tracer, the field data into a group of record packets corresponding to the elements; 6) inserting, using the processor tracer, the group of record packets between ones of the plurality of trace data packets of the trace data to generate a combined packet stream; 7) storing, by the processor tracer in a memory buffer of the processor core, the combined packet stream as a series of output pages; and 8) executing, by the processor core when in a guest profiling mode, a virtual machine monitor (VMM) to map the series of output pages of the memory buffer to host physical pages of main memory using multilevel page tables.

In Example 18, the method of Example 17, wherein storing the combined packet stream in the memory buffer as the series of output pages comprises: 1) while filling a first output page, prefetching a second output page; 2) testing whether the second output page is mapped to a host physical page of the main memory; and 3) triggering a virtual machine exit to request the VMM to map the second output page to the main memory responsive to detecting that the second output page is not mapped to the main memory.

In Example 19, the method of Example 17, further comprising detecting the occurrence of the event after overflow of a performance monitoring counter (PMC) register for the event of the certain type.

In Example 20, the method of Example 17, wherein the group of record packets includes an instruction pointer value corresponding to an address of the instruction that has caused the occurrence of the event, wherein the method further comprises: 1) retrieving, from one of the VMM or an operating system of the virtual machine, an identity of a binary program being executed during the occurrence of the event; 2) retrieving metadata related to the binary program from the operating system, wherein the metadata references a function being executed at or before the occurrence of the event; 3) determining, from the metadata and the instruction pointer, an identity of the function being executed; and 4)sending the identity of the function being executed to a performance analysis tool with the group of record packets.

In Example 21, the method of Example 17, further comprising executing microcode, by the event-based sampler, to perform a series of signal operations that transmit the field data for the elements of the sampling record in a predetermined order to the processor tracer.

In Example 22, the method of Example 17, further comprising: 1) loading a reload value into a performance monitoring counter (PMC) register upon reset of the virtual machine; 2) incrementing the PMC register after detecting each occurrence of the event as a result of execution of the plurality of instructions; 3) detecting an occurrence of the event after the PMC register reaches a predetermined trigger value; and 4) in response to detecting occurrence of the event after the PMC register reaches the predetermined trigger value: a) executing microcode to generate the field data for the elements within the sampling record; and b) reloading the reload value from a reload register into the PMC register.

In Example 23, the method of Example 17, further comprising causing the processor core to generate a time stamped counter as a trace data packet of the plurality of trace data packets one of before or after the group of record packets is inserted between the ones of the plurality of trace data packets.

In Example 24, the method of Example 17, further comprising causing the processor core to generate a paging information packet as a trace data packet of the plurality of trace data packets upon the processor core switching execution from a first virtual machine state to a second virtual machine state, wherein the paging information packet includes an identity of the second virtual machine state.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A processor comprising:
   a memory buffer;
   a circuitry to execute an instruction within a virtual machine, wherein the circuitry executes a virtual machine monitor (VMM) to manage the virtual machine and comprises:
      a processor tracer to capture trace data produced by execution of an instruction and to format the trace data as a plurality of trace data packets; and
      an event-based sampler to generate field data for elements of a sampling record of the memory buffer in response to occurrence of an event of a certain type as a result of execution of the instruction;
   wherein the processor tracer is further to, upon receipt of the field data from the event-based sampler:
      format the field data into a group of record packets corresponding to the elements;
      insert the group of record packets between ones of the plurality of trace data packets of the trace data, to generate a combined packet stream;
      generate a time stamp counter (TSC) packet to indicate a precise time of insertion of the group of record packets;
      insert the TSC packet associated with the group of record packets within the combined packet stream; and
      store the combined packet stream in the memory buffer as a series of output pages using guest physical addresses.

2. The processor of claim 1, wherein the TSC packet is inserted before the group of record packets in the combined packet stream.

3. The processor of claim 1, wherein the group of record packets comprises:
   a block begin indicator that indicates a start to the group of record packets for the event; and
   one or more counters applicable to execution of the instruction when the event occurred.

4. The processor of claim 1, wherein the group of record packets comprises:
   an event-related execution instruction pointer value corresponding to an address of the instruction that has caused the occurrence of the event; and
   one of a block end or a block begin indicator that indicates an end of the group of the record packets for the event.

5. The processor of claim 1, wherein the group of record packets comprises:
   a block begin indicator that indicates a start to the group of record packets for the event;
   one or more last branch register (LBR) values when one of entering or exiting the virtual machine; and
   one of a block end or a block begin indicator that indicates an end of the group of record packets for the event.

6. The processor of claim 1, wherein the processor tracer is further to:
   generate a combined header from a header of each of the elements of the sampling record; and
   insert the combined header into the combined packet stream before the group of record packets.

7. The processor of claim 1, wherein the event-based sampler is further to perform a series of signal operations that transmit the field data for the elements of the sampling record in a predetermined order to the processor tracer.

8. A method comprising:
   executing, by a processor, a plurality of instructions for a virtual machine;
   capturing, using a processor tracer of the processor, trace data from execution of the plurality of instructions;
   formatting, using the processor tracer, the trace data into a plurality of trace data packets;
   generating, using an event-based sampler of the processor, field data for elements of a sampling record in response to occurrence of an event of a certain type as a result of execution of the plurality of instructions;
   formatting, using the processor tracer, the field data into a group of record packets corresponding to the elements;

inserting, using the processor tracer, the group of record packets between ones of the plurality of trace data packets of the trace data to generate a combined packet stream;

generating, by the processor tracer, a time stamp counter (TSC) packet to indicate a precise time of insertion of the group of record packets;

inserting, by the processor tracer, the TSC packet associated with the group of record packets within the combined packet stream; and storing, by the processor tracer, the combined packet stream in a memory buffer as a series of output pages using guest physical addresses.

9. The method of claim 8, wherein inserting the TSC packet further comprises inserting the TSC packet before the group of record packets in the combined packet stream.

10. The method of claim 8, wherein formatting the field data into the group of record packets further comprises:
inserting a block begin indicator that indicates a start to the group of record packets for the event;
inserting, together, one or more counters applicable to execution of the instruction when the event occurred;
inserting an event-related execution instruction pointer value corresponding to an address of the instruction that has caused the occurrence of the event; and
inserting one of a block end or a block begin indicator that indicates an end of the group of the record packets for the event.

11. The method of claim 8, wherein formatting the field data into the group of record packets further comprises:
inserting a block begin indicator that indicates a start to the group of record packets for the event;
inserting one or more last branch register (LBR) values when one of entering or exiting the virtual machine; and
inserting one of a block end or a block begin indicator that indicates an end of the group of the record packets for the event.

12. The method of claim 8, further comprising, by the processor tracer:
generating a combined header from a header of each of the elements of the sampling record; and
inserting the combined header into the combined packet stream before the group of record packets.

13. The method of claim 8, further comprising performing, by the event-based sampler, a series of signal operations that transmit the field data for the elements of the sampling record in a predetermined order to the processor tracer.

14. A system comprising:
a main memory; and
a core having a memory buffer and that is to execute an instruction within a virtual machine, wherein the core executes a virtual machine monitor (VMM) to manage the virtual machine and further comprises:
a processor tracer to capture trace data produced by execution of the instruction and to format the trace data as a plurality of trace data packets; and
an event-based sampler to generate field data for elements of a sampling record in response to occurrence of an event of a certain type as a result of execution of the instruction;
wherein the processor tracer is further to, upon receipt of the field data from the event-based sampler:
format the field data into a group of record packets corresponding to the elements;
insert the group of record packets between ones of the plurality of trace data packets of the trace data, to generate a combined packet stream;
generate a time stamp counter (TSC) packet to indicate a precise time of insertion of the group of record packets;
insert the TSC packet associated with the group of record packets within the combined packet stream; and
store the combined packet stream in the memory buffer as a series of output pages using guest physical addresses.

15. The system of claim 14, wherein the TSC packet is inserted before the group of record packets in the combined packet stream.

16. The system of claim 14, wherein the group of record packets comprises:
a block begin indicator that indicates a start to the group of record packets for the event;
one or more counters applicable to execution of the instruction when the event occurred.
an event-related execution instruction pointer value corresponding to an address of the instruction that has caused the occurrence of the event; and
one of a block end or a block begin indicator that indicates an end of the group of the record packets for the event.

17. The system of claim 14, wherein the group of record packets comprises:
a block begin indicator that indicates a start to the group of record packets for the event;
one or more last branch register (LBR) values when one of entering or exiting the virtual machine; and
one of a block end or a block begin indicator that indicates an end of the group of the record packets for the event.

18. The system of claim 14, wherein the processor tracer is further to:
generate a combined header from a header of each of the elements of the sampling record; and
insert the combined header into the combined packet stream before the group of record packets.

19. The system of claim 14, wherein the event-based sampler is further to perform a series of signal operations that transmit the field data for the elements of the sampling record in a predetermined order to the processor tracer.

20. The processor of claim 14, wherein the VMM is to, when in a guest profiling mode, map the series of output pages of the memory buffer to host physical pages of the main memory using multilevel page tables, and wherein, to store the combined packet stream in the memory buffer as the series of output pages, the processor tracer is further to:
while filling a first output page, prefetch a second output page;
test whether the second output page is mapped to a host physical page of the main memory; and
trigger a virtual machine exit to request the VMM to map the second output page to the main memory responsive to detecting that the second output page is not mapped to the main memory.

* * * * *